United States Patent [19]

Ogawa

[11] Patent Number: 5,778,405
[45] Date of Patent: Jul. 7, 1998

[54] APPARATUS AND METHOD FOR RETRIEVING DICTIONARY BASED ON LATTICE AS A KEY

[75] Inventor: Tomoya Ogawa, Kawasaki, Japan

[73] Assignee: Fujitsu Ltd., Kawasaki, Japan

[21] Appl. No.: 725,955

[22] Filed: Oct. 7, 1996

[30] Foreign Application Priority Data

Nov. 10, 1995 [JP] Japan .................. 7-292989

[51] Int. Cl.⁶ .................................................. G06F 17/30
[52] U.S. Cl. ........................... 707/532; 707/3; 707/5
[58] Field of Search .................... 701/6, 1, 2, 3, 701/5, 7, 532, 104, 103, 102; 711/202; 345/348; 364/492; 382/229, 215; 395/800.17

[56] References Cited

U.S. PATENT DOCUMENTS 5,355,473 10/1994 Au ........................................... 707/3
5,357,431 10/1994 Nakada ................................. 707/531
5,528,701 6/1996 Aref ...................................... 382/178
5,640,551 6/1997 Chu .......................................... 707/5
5,655,129 8/1997 Ito ......................................... 707/532

*Primary Examiner*—Thomas G. Black
*Assistant Examiner*—Srirama Channavajjala
*Attorney, Agent, or Firm*—Staas & Halsey

[57] ABSTRACT

A dictionary retrieval apparatus and method for retrieving a TRIE (Tree Retrieval) dictionary based on a lattice as a key, in which each candidate character of a recognition result is handled as a data node, and the character lattice is structured by connecting each of candidate characters with the control nodes. Based on control node connection information, character strings corresponding to each of the paths are retrieved by traversing the data nodes of a character lattice from a head to a tail. According to this method, a higher retrieval efficiency is achieved in comparison with the processing in which matching with the dictionary is implemented after all retrieval keys contained in the character lattice are generated.

18 Claims, 29 Drawing Sheets

| | | | | | |
|---|---|---|---|---|---|
| FIRST CANDIDATE | 文 | 学 | に | 行 | く |
| SECOND CANDIDATE | 大 | 字 | 院 | 竹 | |
| THIRD CANDIDATE | 丈 | | | | |

| CHARACTER INFORMATION | RECOGNITION DISTANCE VALUE | CONTROL NODE ID CONNECTED TO DATA NODE |
|---|---|---|

| |
|---|
| POINTER TO THE NEXT NODE |
| THE LATEST CONTROL NODE |
| DATA NODE NUMBER FOR THE LATEST CONTROL NODE |
| POINTER TO THE PARENT NODE |
| POINTER TO CORRESPONDING TRIE DICTIONARY |
| EVALUATION FUNCTION VALUE |

FIG. 12

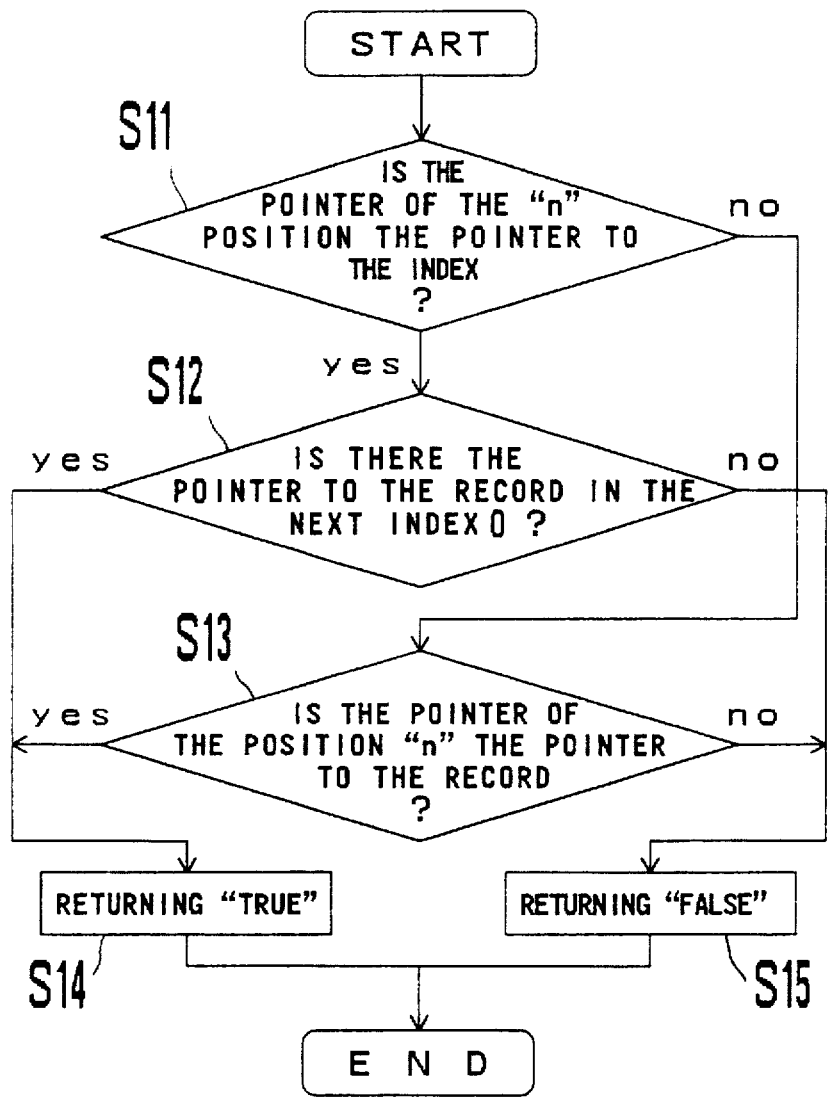
F I G. 1 5

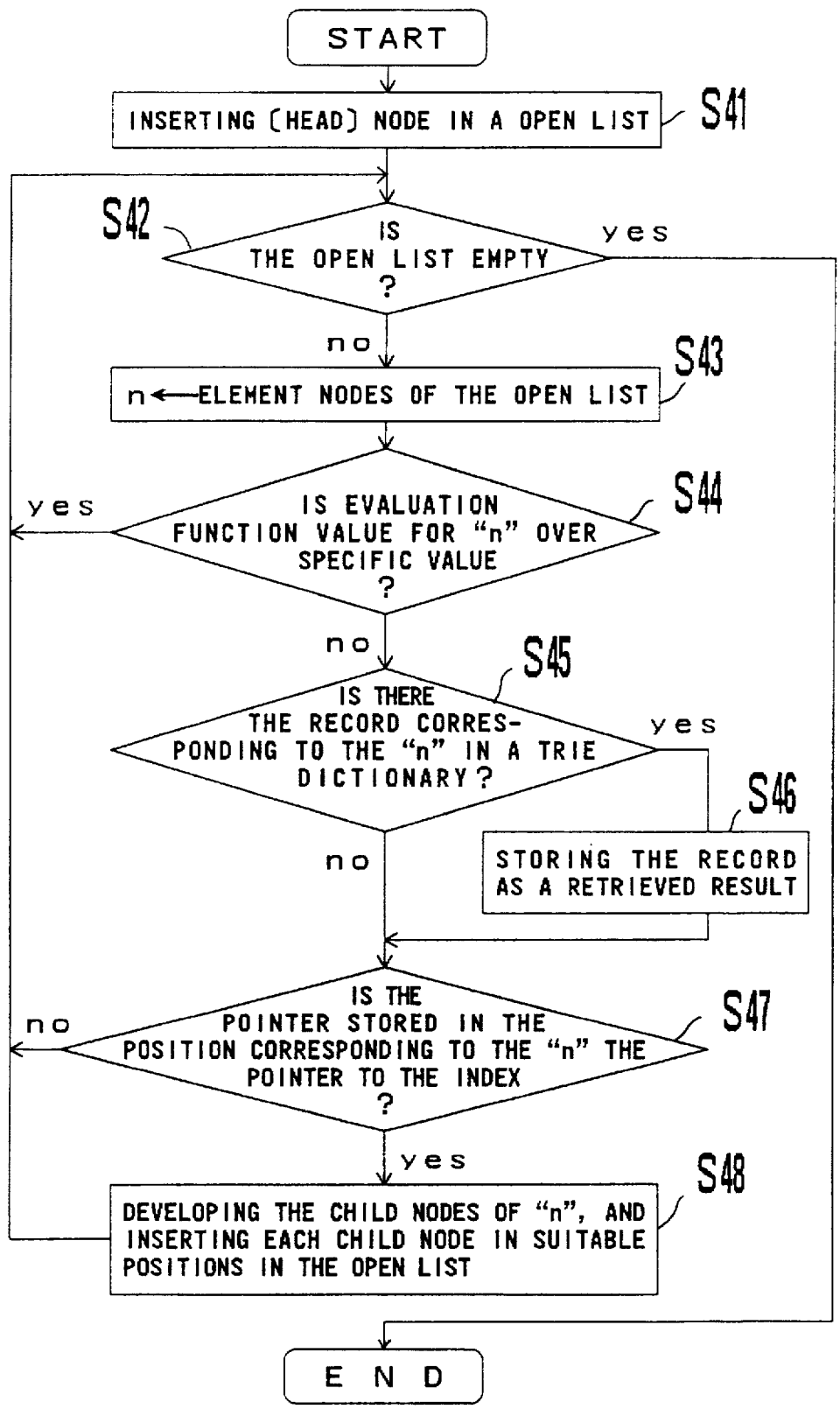
F I G. 21

... find ...

FIG. 24

|  |  |  |  |  |
|---|---|---|---|---|
| FIRST CANDIDATE | f | i | n | d |
| SECOND CANDIDATE | t | j | o | a |
| THIRD CANDIDATE |  |  |  | e |

FIG. 25

APPARATUS AND METHOD FOR RETRIEVING DICTIONARY BASED ON LATTICE AS A KEY

BACKGROUND OF THE INVENTION

1. Field of the Invention

The present invention relates to a dictionary retrieval apparatus and method for retrieving a dictionary based on lattice structure data including plural candidates of a recognized character or a phoneme, for character recognition, or voice recognition, and so on.

2. Description of the Related Art

In recent years, further effective data input methods to a computer are being researched. For data input to a computer, recognition technologies, such as character recognition, voice recognition, and so on, are known. For a collating method with a dictionary for character strings to be recognized, there are a hashing method, B-Tree method, and TRIE (Tree Retrieval) method. The hashing method is the method for seeking a storing address of a registration word corresponding to an internal code for a retrieval key. The B-Tree method is the method for retrieving registered words stored in each node of the B-Tree which is one type of a search tree having multiple branches from a single node. The TRIE method is the method for retrieving registered words stored in a leaf by branching, by comparing a part of a retrieval key with an index stored in a tree node. For recognition processing, plural candidates for a recognized result may exist for a character and a phoneme. For a dictionary retrieval method for plural candidates, the dictionary retrieval based on lattice structure data, in which candidate characters and phonemes are structured with a lattice structure, is being researched.

As one of conventional dictionaries which are used in the recognition procedure, there is an right truncation compressed dictionary. In this anaphora compressed dictionary, a recognition word stored in the dictionary is stored by being compressed when agreeing with a first part of another recognized word. For three phrases, such as "computer architecture", "computer system" and "computer introduction", the first word "computer" is compressed. That is because the word "computer" is common to these three phrases. For character string retrieval processing using the anaphora compressed dictionary, a set of available recognition character strings, which are obtained sequentially from the top of given lattice characters, is obtained and compared with the recognition words in the dictionary, then the matching processing is implemented.

However, there are following problems for the above mentioned conventional retrieval processing.

As a processing example of the case in which plural candidates of the recognized result may exist, there is the recognition processing for hand written characters and the voice recognition processing. For this type of the recognition processing, dictionary retrieval is not implemented on a large scale, whereas the dictionary retrieval based on the hashing method is mainly implemented. However, the hashing method has problems in which control logic becomes complex when key conflicts happen many times, and searching efficiency becomes low when the lattice becomes large. Further the B-Tree method has the other problem in which high speed retrieval cannot be realized.

The TRIE method can realize a higher speed retrieval than the above described methods. However, the bigger the number of candidate characters, the bigger the number of generated character strings, if the character strings are generated by combining the candidate characters of the lattice, when a TRIE dictionary is retrieved based on a character lattice. An excess of combinations will occur if the dictionary retrieval is implemented by setting each of the character strings as the key, and the retrieval becomes impossible within a reasonable operation time. As a result, the problem, in which the recognition processing having the necessity of implementing the dictionary retrieval many times cannot be implemented at high speed, may arise.

SUMMARY OF THE INVENTION

The object of the present invention is to provide a method and apparatus for realizing high speed retrieval using a TRIE dictionary based on given lattice structured data.

A dictionary retrieval unit of the present invention includes a retrieval unit, complex-key management unit, retrieval state memory unit, and an output unit.

The complex-key management unit manages information of a complex-key composed of plural data nodes combined organizationally which includes two or more retrieval keys. The retrieval unit retrieves records corresponding to the above described TRIE dictionary by traversing the data nodes in the above described complex-key.

The complex-key is structured by connecting in series the data nodes representing candidate phonemes and the candidate characters of the recognized result, for example, and branched into a plurality of data node sequences depending on the number of data nodes to be linked next. Therefore, one complex-key contains the sequence of plural data nodes from a head to a tail as the retrieval key. As this kind of key, there is a character lattice.

The retrieval unit examines whether or not the record corresponding to a path to each of data nodes while traversing the data nodes successively from the head to the tail of the complex-key. Then, the corresponding record, if it exists, is retrieved as the retrieved result, and stored in the retrieval state memory unit. Further, the next data node, if there is no corresponding record, becomes a retrieval target, and the TRIE dictionary is retrieved in the same way.

The retrieval state memory unit stores information representing the position of the data node to be retrieved in the above described complex-key, and the retrieved result obtained by the retrieval unit. In order to store a retrieval state, such data structure as an OPEN list is employed. Since the output unit outputs the retrieved result, the obtained retrieved result is presented to a user as the candidate character strings of a recognized result, for example.

According to this kind of dictionary retrieval unit, the complex-key is compared with the registered character strings of the TRIE dictionary, while the complex-key is developed successively from the head. Because of this, a comparison with the dictionary can be realized at one time for a duplication of parts in plural retrieval keys contained in the complex-key, and the efficiency of the dictionary retrieval is enhanced.

Moreover, the dictionary retrieval unit calculates an evaluation function value representing the certainty of the character strings for each data node from the head to each data node of the complex-key. Then, retrieval path pruning can be implemented by terminating the retrieval when the value becomes a predetermined value, and the high speed processing can be achieved.

The retrieval method by the dictionary retrieval unit of the present invention can be applied to proofreading support processing and character recognition processing for an arbitrary language such as Japanese, Chinese, Korean, English, French, German, and so on, and can be implemented even if symbols and graphics are contained in the retrieval result characters. Further, the present invention can be applied to such processing as voice recognition, etc.

BRIEF DESCRIPTION OF THE DRAWINGS

The present invention will be more apparent from the following detailed description in conjunction with the accompanying drawings, in which:

FIG. 4 illustrates a source picture;

FIG. 5 illustrates an example showing a character lattice;

FIG. 8 illustrates a data node structure;

FIG. 12 illustrates a node structure of an OPEN list;

FIG. 15 is a flowchart showing record recognition processing;

FIG. 21 is a flowchart showing the third retrieval processing;

FIG. 24 illustrates an original picture of an English word;

FIG. 25 illustrates an English character lattice example;

DESCRIPTION OF THE PREFERRED EMBODIMENT

The preferred embodiment of the present invention is explained hereinafter with reference to the figures.

Figure 1:
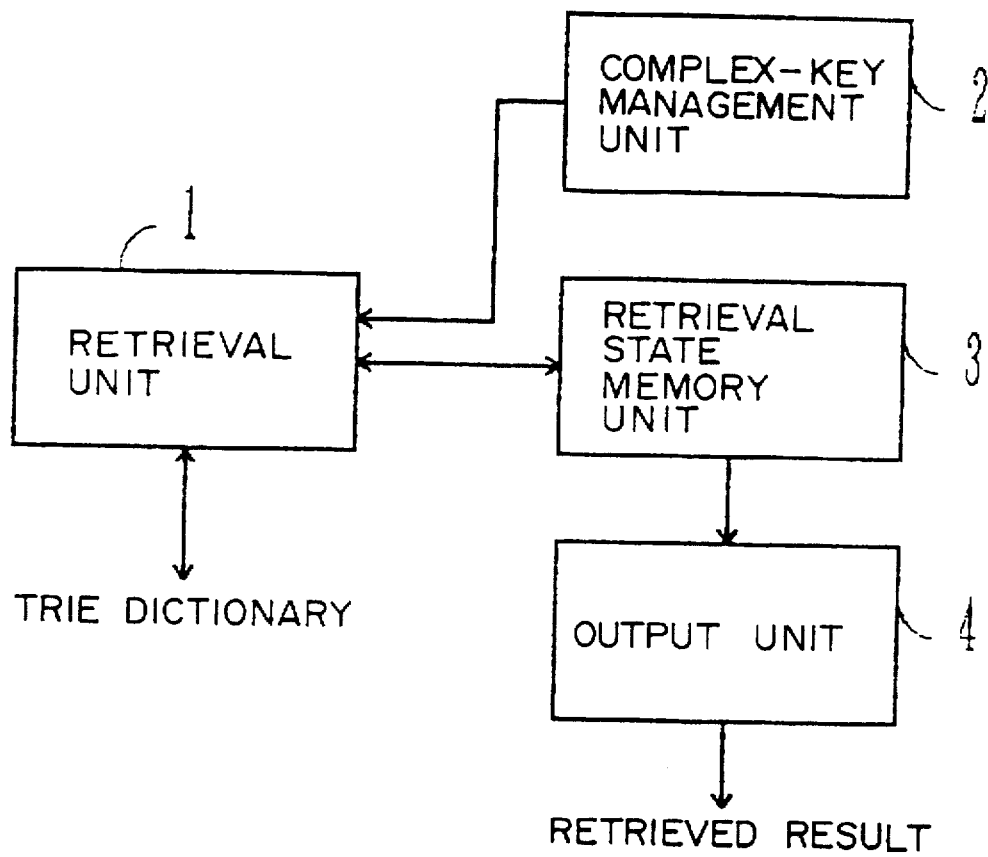
FIG. 1 is a principle block diagram of a dictionary retrieval unit of the present invention.

FIG. 1 is a principle block diagram of a dictionary retrieval apparatus of the present invention. The dictionary retrieval apparatus, in FIG. 1, includes a retrieval unit 1, complex-key management unit 2, retrieval state memory unit 3, and output unit 4.

The complex-key management unit 2 manages information of a complex-key which includes plural data nodes combined organizationally and includes two or more retrieval keys.

The retrieval unit 1 retrieves a corresponding record in the above described TRIE dictionary by traversing data nodes in the above described complex-key, and retrieves the record corresponding to the above described TRIE dictionary.

The retrieval state memory unit 3 stores position information for the data nodes to be retrieved in the above complex-key and a retrieval result obtained from the retrieval unit 1.

Then, the output unit 4 outputs the above described retrieval result.

The complex-key contains data nodes, which represent candidate characters and candidate phonemes for a recognition result, in a recognition order, and branches into the sequences of multiple data nodes according to the number of data nodes to be connected next to each data node. Therefore, an individual complex-key includes the sequences of multiple data nodes from a head to a tail as the retrieval key, and a character lattice is this kind of complex-key.

The retrieval unit 1 examines whether or not the record corresponding to a path to each data node exists in the TRIE dictionary by traversing the data nodes sequentially from the head to the tail of the complex-key. Then, the corresponding record is retrieved as the retrieved result if found, and is stored in the retrieval state memory unit 3. Further, the next data node is to be retrieved if the corresponding record cannot be found, and the TRIE dictionary is retrieved in the same way.

The thus-obtained retrieval result is externally output as the candidate character strings of the recognition result, for example, and is presented to the user.

According to this type of the dictionary retrieval unit, the complex-key is compared with the registered character strings of the TRIE dictionary in such a way that the complex-key is developed from the head in series. Thus, one search is sufficient for the comparison with the dictionary in a duplicated portion of the multiple retrieval key contained in the complex-key, and the retrieval processing becomes efficient. Further, the speed of the dictionary retrieval becomes much higher if the processing, which terminates when the suitable retrieval result is obtained, is implemented.

Figure 2:
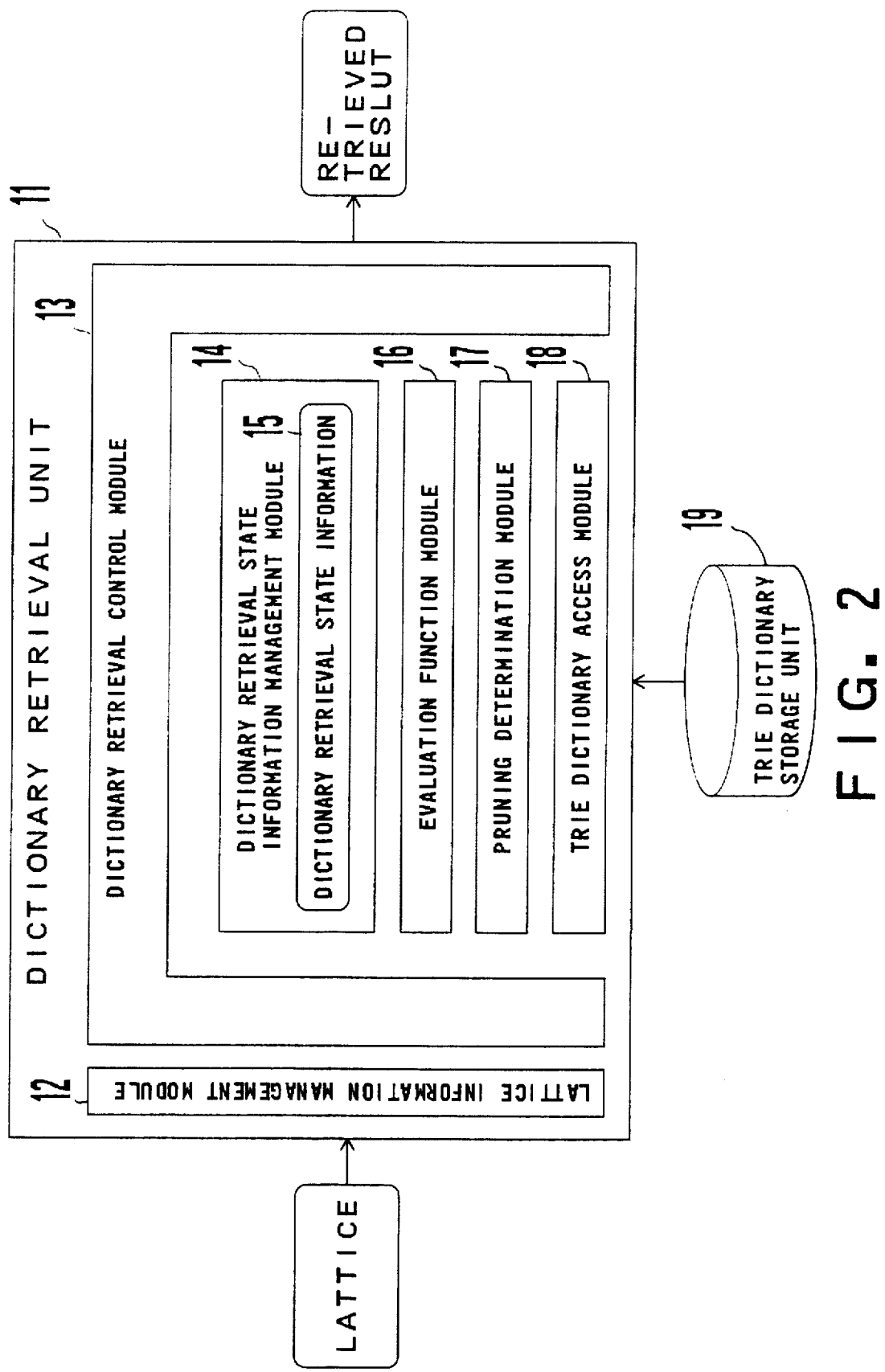
FIG. 2 is a modular block diagram of the dictionary retrieval unit.

For example, the retrieval unit 1 in FIG. 1 corresponds to a dictionary retrieval control module 13, which is explained as the following, shown in FIG. 2. The complex-key management unit 2 and retrieval state memory unit 3 correspond to a lattice information management module 12 and a dictionary retrieval state information management module 14 respectively. Further, the output unit 4 corresponds to an output unit 24 in FIG. 3.

FIG. 2 is a modular block diagram of the dictionary retrieval apparatus. A dictionary retrieval apparatus 11 in FIG. 2 includes the lattice information management module 12, the dictionary retrieval control module 13, the dictionary retrieval state information management module 14, an evaluation function module 16, a pruning determination module 17, and a TRIE dictionary access module 18.

The lattice information management module 12 manages input lattice information. The dictionary retrieval control module 13 accesses a portion corresponding to a lattice node in the TRIE dictionary stored in a TRIE dictionary storage unit 19 through the TRIE dictionary access module 18 by traversing the lattice nodes in series, which are obtained from the lattice information management module 12, according to a predetermined control method. Then, the dictionary retrieval is implemented by determining whether or not the record exists in the dictionary, and the retrieved result is output. The dictionary retrieval state information management module 14 updates the dictionary retrieval state information 15 depending on need, and supplies the updated result to the user if necessary, while the retrieval is implemented by the dictionary retrieval control module 13.

As the retrieval implementation proceeds, the evaluation function module 16 calculates an evaluation value at the retrieval point, and sends this value to the dictionary retrieval control module 13. The dictionary retrieval control module 13 implements efficient retrieval by applying the received evaluation value. The pruning determination module 17 determines whether or not pruning at the node of the lattice is possible by using the evaluation value. When the pruning determination module 17 determines that the pruning is possible, the lattice which is deeper than the corresponding node, in which the pruning is possible, will not be retrieved, so the dictionary retrieval will become more efficient as a result.

Figure 3:
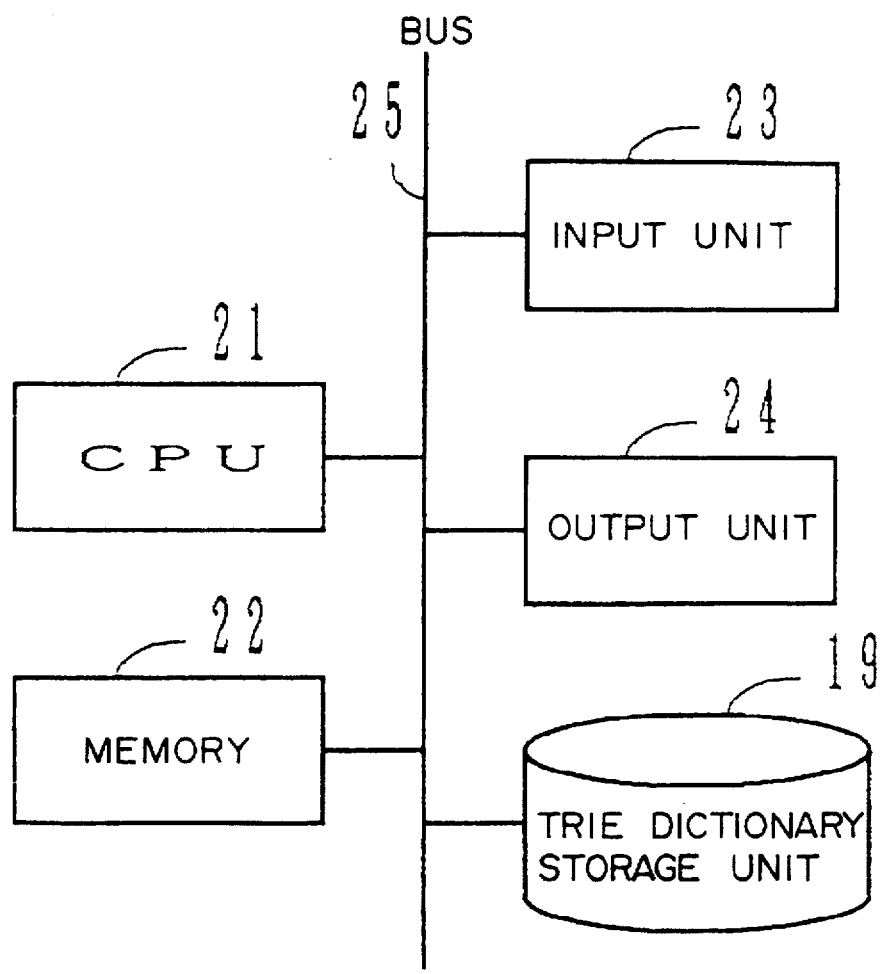
FIG. 3 is an information processing system block diagram.

FIG. 3 is an information processing system block diagram to realize the dictionary retrieval apparatus. The information processing system in FIG. 3 includes a CPU 21, memory 22, input unit 23, output unit 24, TRIE dictionary storage unit 19, and BUS 25 for connecting them. When this type of the information processing system implements character recognition processing, the input unit 23 can be an image input device such as a scanner, and can be used to input the original source image of the character strings to be recognized. Further, when voice recognition processing is implemented, the input unit 23 is a voice input device including a micro-phone, voice translation device, and so on, and is used to input voice to be recognized.

The CPU 21 implements an input source picture or voice recognition processing by using the memory 22, and generates the lattice containing plural candidate characters. Further, the CPU 21 can perform the same functions as the lattice information management module 12, dictionary retrieval control module 13, dictionary retrieval state information management module 14, evaluation function module 16, pruning determination module 17, and TRIE dictionary access module 18, by executing programs stored in the memory 22. Then, the CPU 21 retrieves the TRIE dictionary in the TRIE dictionary storage unit 19 by treating the lattice as the retrieval key. The output unit 24 is, for example, a display device, printer device, and so on, and used to display and output a state of retrieval being performed and retrieval result.

Further, the character recognition processing based on an example of a Japanese language source picture is explained by referring to FIGS. 4 to 17.

Figure 4:
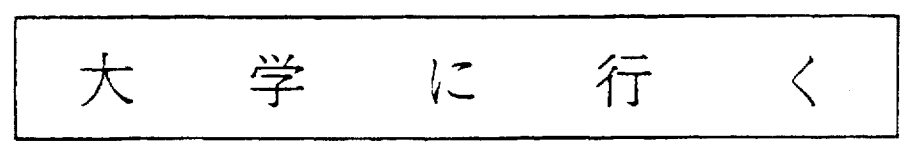
Figure 6:
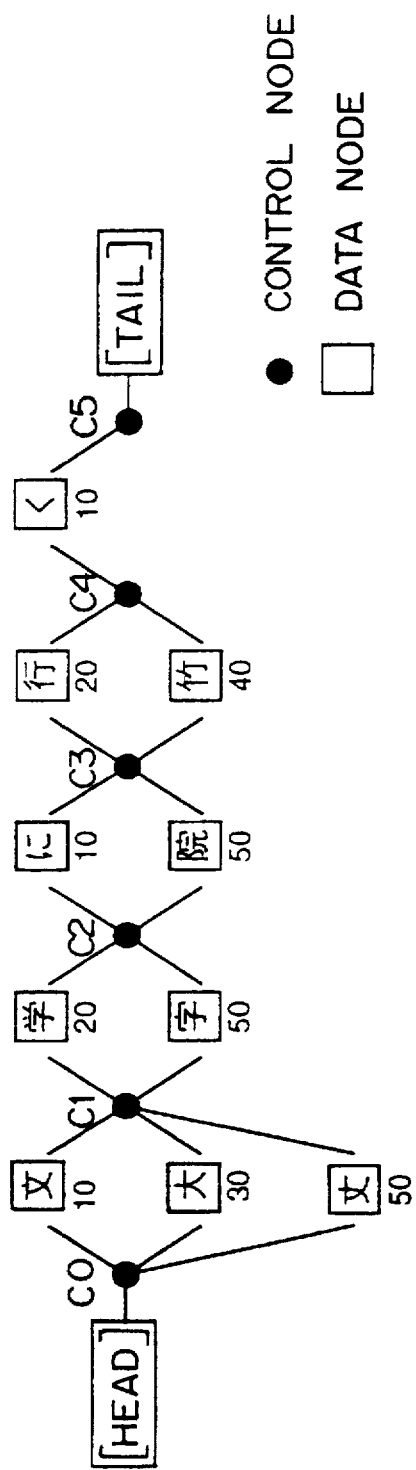
FIG. 6 illustrates the first character lattice using a control node.

FIG. 4 shows the source picture to be recognized. When the source picture in FIG. 4 is recognized as characters "大学に行く" by an OCR (optical character recognition) process, a character lattice as seen in FIG. 5 can be obtained if there is no character boundary setting error. In the lattice in FIG. 5, on the first line, the first candidate for each character contained in the source picture image is listed, and the second candidate and the third candidate are listed on the second line and the third line respectively. FIG. 6 is drawn by representing the character lattice with data nodes and control nodes.

The first character lattice in FIG. 6 includes the control nodes and the data nodes, and the data nodes are arranged in the lattice form in horizontal and vertical directions. Each candidate character as a character recognition result is stored in the data node with its attribute.

The attribute of the candidate character depicts the evaluation value representing the certainty as the character recognition result. Here, the numerical value written beneath to each data node represents the recognition distance value which is one type of the evaluation value. The recognition distance value means the distance value between the character pattern of the recognized result and the character pattern of the available character in the corresponding dictionary, which represents the certainty of the candidate character for the source character. The smaller the value of the recognition distance, the closer the resemblance relationship between the source character pattern and the candidate character pattern in the dictionary, and the higher the certainty of the candidate character. Here, data nodes of "[Head]" and "[Tail]" are not recognized results, but special data nodes which are set for processing convenience. Further, the recognition distance value is not indicated there.

The control node exists between the data nodes, and is mainly applied to dictionary retrieval processing control and applied in order to provide information necessary to the processing after the retrieval. For the various usages as the above, identifiers such as C0, C1, C2, C3, C4, and C5 are supplemented above the control nodes in node position order from the "[Head]" toward the "[Tail]." The smaller the numerical value that the identifier contains, the closer its position to the "[Head]".

Figure 7:
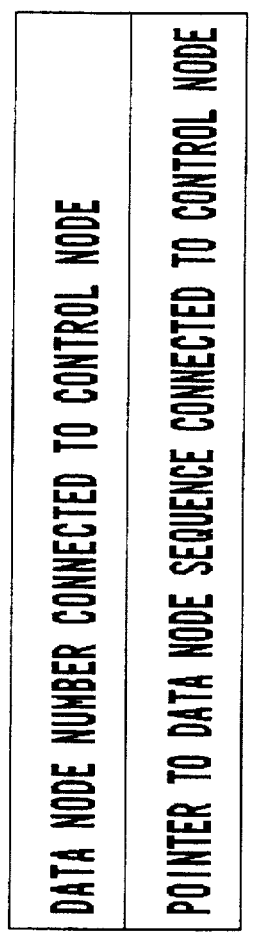
FIG. 7 illustrates a control node.

FIGS. 7 and 8 illustrate corresponding control node and data node structures which the lattice information management module 12 manages respectively. The number of data nodes connected to the control node and pointers to those data nodes are stored in the control node in FIG. 7. For example, the number of the data nodes for the control node C0 in FIG. 6 becomes 3, because the subsequent data nodes are "大", "大" and "丈", and the pointers to these three data nodes are stored.

Further, the identifier (control node ID) of the control node connected to the data nodes, the recognition distance value, and the character information of the candidate character represented by the data node, are stored in the data node in FIG. 8. For example, in the case of the data node "大", the character information representing the candidate character "大", its recognition distance value 10, and the succeeding control node identifier C1, are stored.

Figure 9:
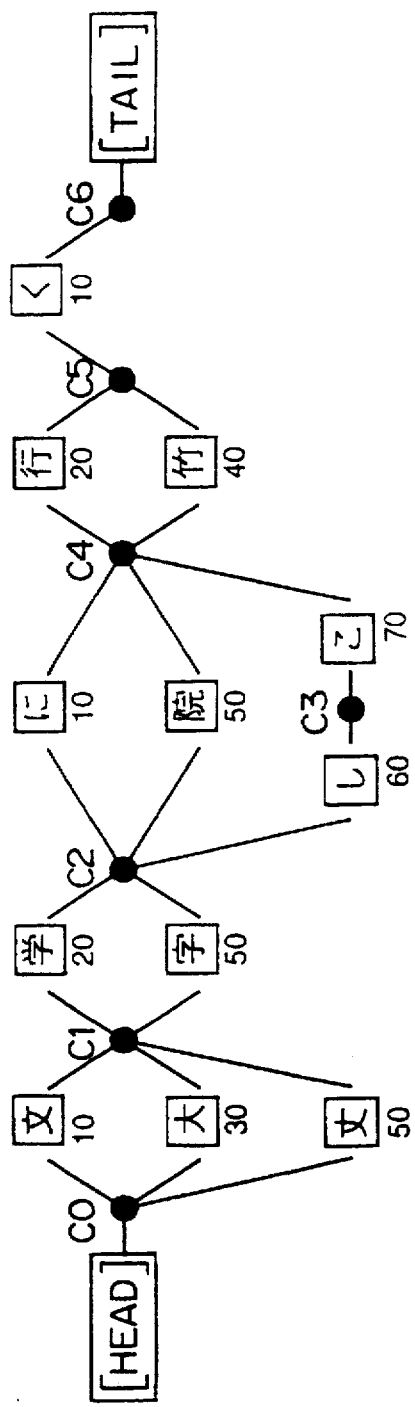
FIG. 9 illustrates the second character lattice in which a boundary setting error is contained.

Although the sequence of the control nodes and the sequence of the data nodes, in FIG. 6, are assumed to be a sequence of normal nodes having no boundary setting errors during recognition, the data nodes may not be arranged in the lattice form if there are boundary setting errors. In this case, the character lattice as a recognition result would be data in the form of graphs as indicated in FIG. 9. When the second character lattice in FIG. 9 is compared with the first character lattice in FIG. 6, two candidate characters "し" and "こ" are inserted between the control nodes C2 and C4, and these are generated based on the boundary setting for "に" which is contained in the source picture image. Thus, the data node "し", "こ", and the control code C3, are arranged in parallel with the other recognition candidate data nodes "に" and "際" for an identical character.

Figure 10:
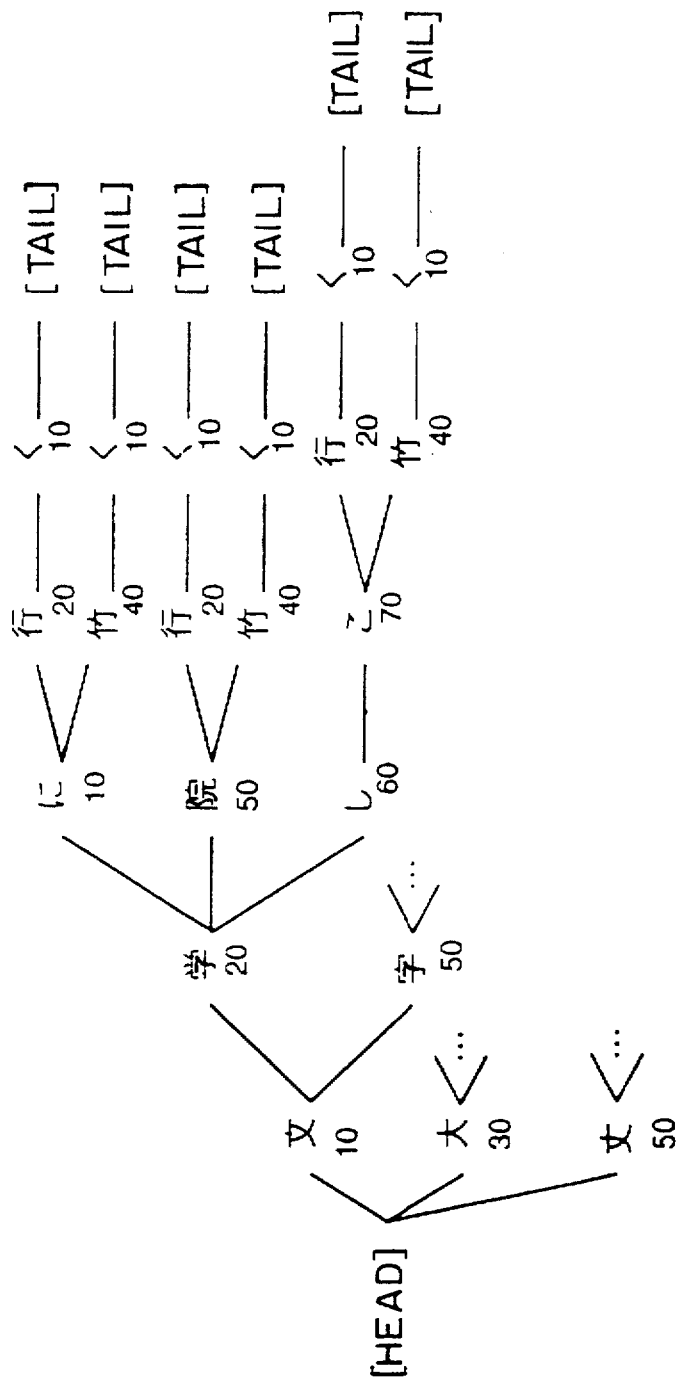
FIG. 10 is a tree showing the development of the second character lattice.

The dictionary retrieval control module 13 implements the dictionary retrieval by traversing each node of the character lattice in FIG. 6 and FIG. 9. When the character lattice in FIG. 9 is treated as the retrieval key, this kind of processing is identical to the processing which traverses the tree structure in FIG. 10 in which the character lattice is developed. In FIG. 10, the data nodes connected to each of the control nodes are developed in order by treating the data node "[Head]" as a root node, and the end of each branch terminates with the data node "[Tail]". The succeeding development after the data node "丈" is the same tree development as made by the data node "丈", and the succeeding development after the data nodes " 大" and "丈" is the same tree development as made by the data node "丈".

Figure 11:
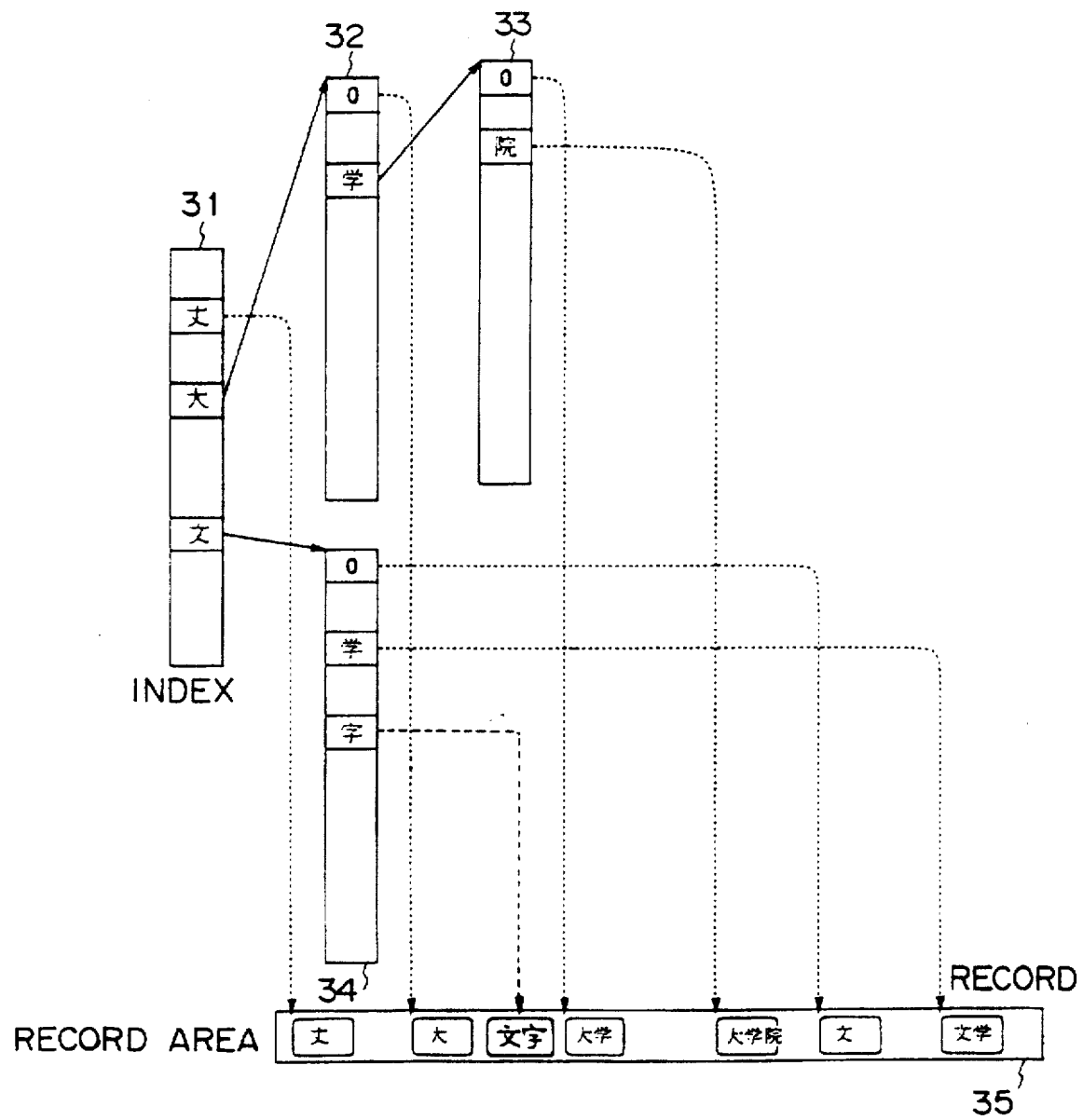
FIG. 11 illustrates a TRIE dictionary structure.

FIG. 11 illustrates a TRIE dictionary structure having these types of candidate characters. The TRIE dictionary in FIG. 11 is a collection of records of registered words and character strings which are treated as the key, the records of registered words are expressed with a pair of data including a part of speech and information representing the word itself. For example, the record " 大" in record area 35 includes data representing the word " 大" and data representing a prefix, and a record " 大丈" includes data representing the word " 大丈" and data representing a common noun.

Further, the key is expressed by an index tree in the TRIE dictionary in most cases. When the dictionary retrieval is implemented by treating the normal character string as the key, the records (if they exist) corresponding to the key are output as a retrieved result by traversing successively paths corresponding to each of the elements of the character string key from a root index of the index tree. However, the records found in the course of paths are output together as the retrieved result, since the records found partway are useful in most cases when the character recognition processing is implemented in practice.

In FIG. 11, the pointer to the record "丈" in the record area 35 is stored in the position of the "丈" in an index 31, the pointer to the next index 32 and the pointer to the next index 34 are stored in the " 大" position and "丈" position respectively. Here, the pointer to the record is indicated by a broken line, and the pointer to the index is indicated by a solid line. Actually, the pointers are distinguished by using an MSB, etc. of each of the pointers.

The pointer to the record " 大" is stored in the top position 0 of an index 32, and the pointer to the index 33 is stored in the position of "丈". Similarly, the pointers to the records " 大丈", " 大学院", " 文丈" and " 文丈" are stored in the indexes 33 and 34.

In the dictionary retrieval of the present invention, the character strings are not generated individually from the character lattice representing a plurality of keys, but the character lattice nodes are examined successively from the top of the character lattice, and paths corresponding to the candidate characters for each of the data nodes are traversed successively throughout the index tree. The successive traverse of the character lattice nodes as described before is identical to the traverse of the tree structure in FIG. 10. If the retrieval is implemented in this way, all the keys contained in the character lattice do not need to be generated, and the efficient retrieval can be possible since the retrieval space can be limited to within the area in which the retrieved result can exist.

Although many types of traverse methods known as tree searches for the lattice nodes can be applied, the method using OPEN lists is explained here as a good example for easy explanation. The OPEN lists correspond to the dictionary retrieval state information 15, and include data nodes in the lattice being retrieved.

FIG. 12 illustrates an arrangement structure forming the OPEN lists for each element node. Various elements such as a pointer to the next OPEN list element node, an ID for the latest control node, a data node number for the latest control node, a pointer to a parent node, a pointer to a corresponding TRIE dictionary, and an evaluation function value, are stored in each element node of the OPEN list in FIG. 12. Here, the data node number for the latest control node is identical to an identification number for a successive data node, which is determined for convenience at the latest control node immediately preceding the data node being retrieved in the lattice. Further, the pointer to the TRIE dictionary is the pointer pointing to the TRIE dictionary used in the retrieval, and the evaluation function value represents the certainty of the character string calculated by using the character recognition distance value, etc.

Figure 13:
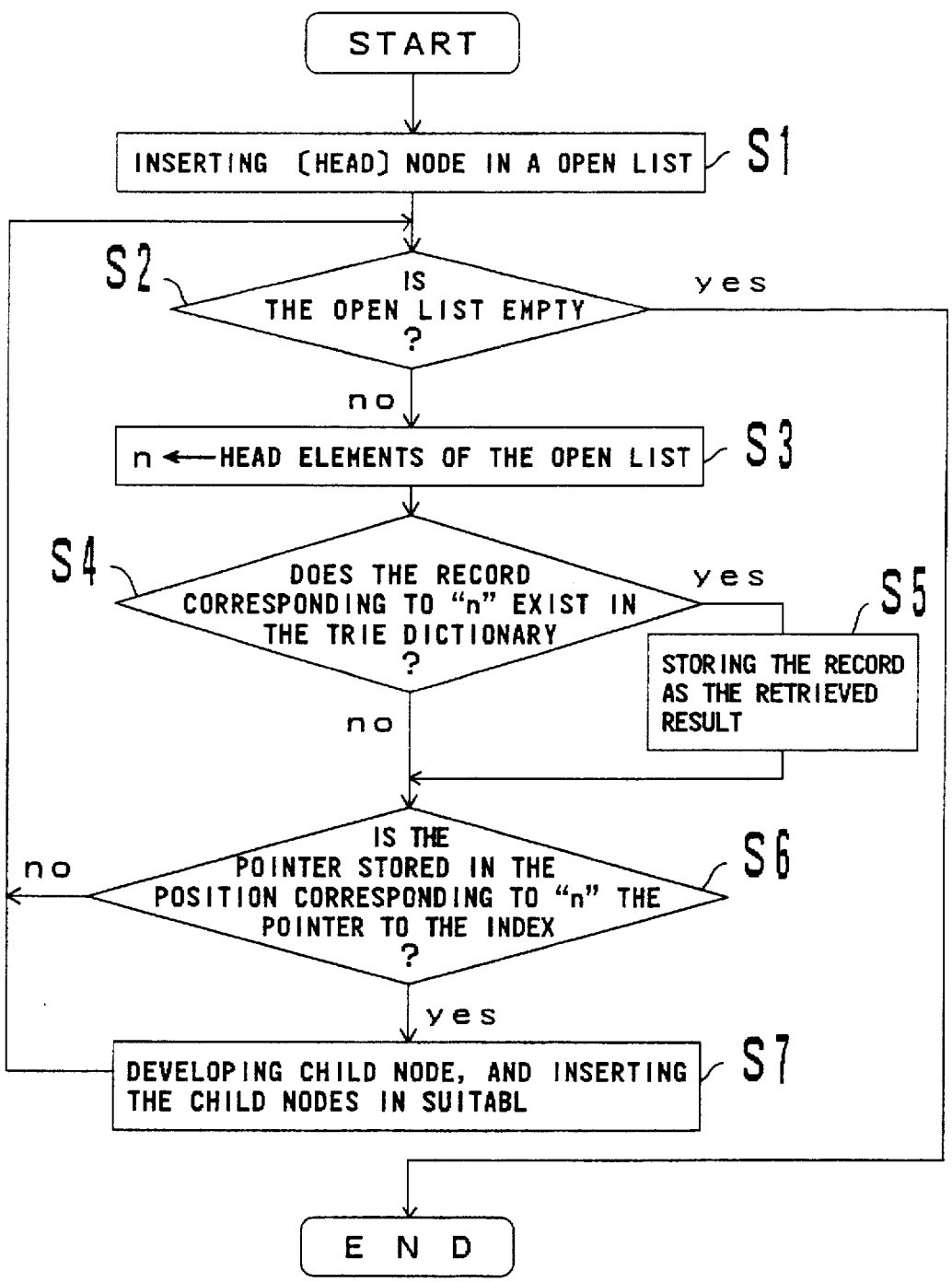
FIG. 13 is the first retrieval procedure flowchart.
Figure 14:
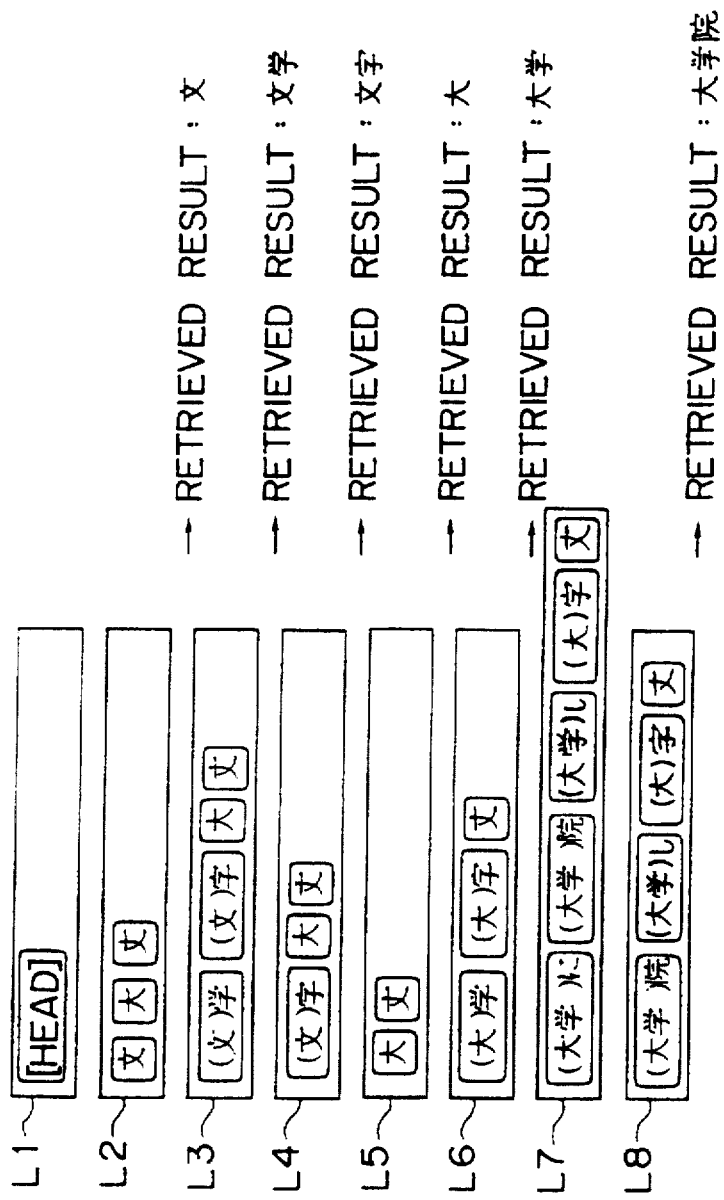
FIG. 14 illustrates depth first search.

FIG. 13 is the first retrieval procedure flowchart based on the OPEN list. The retrieval processing program is executed by the dictionary retrieval control module 13. In FIG. 13, when the processing is started, to begin with, the dictionary retrieval control module 13 inputs the lattice data node "[Head]" into the OPEN list in the dictionary retrieval state information management module 14 (step S1). The OPEN list L1 in FIG. 14 represents the state in which the "[Head]" retrieved from the character lattice in FIG. 9 is stored.

Next, it is checked whether or not the OPEN list is empty (step S2), the head element node in the OPEN list becomes a node "n" if the OPEN list is not empty (step S3). Then, it is checked whether or not the record corresponding to the node "n" exists in the record area 35 in the TRIE dictionary (step S4).

FIG. 15 is a flowchart of a sub-routine showing the record checking processing at step S4. In FIG. 15, when the processing is started, the dictionary retrieval control module 13, to begin with, checks whether or not the pointer at the node "n" in the TRIE dictionary, namely, the pointer stored in the position for the index corresponding to the node "n" is the pointer to the index (step S11).

For the case in which the pointer positioned at the node "n" is the pointer to the index, it is checked whether or not the pointer to the record in the record area 35 is stored in the position 0 in the next index pointed to by the above described pointer positioned at the node "n" (step S12). Then, the processing terminates by returning "true" to a main-routine in FIG. 13 (step S14) if there is a pointer to the record, or the processing terminates by returning "false" to the main-routine if there is not a pointer to the record (step S15).

At step S11, if the pointer positioned at the node "n" is not the pointer to the index, it is checked whether or not this pointer is the pointer to the record (step S13). Then, the processing terminates by returning "true" to the main-routine if there is a pointer to the record (step S14), or the processing terminates by returning "false" to the main-routine if there is not the pointer to the record (step S15).

If "true" is returned from the sub-routine, the dictionary retrieval control module 13 retrieves the record from the record area 35 by using the pointer to the record corresponding to the node "n," and stores the retrieved record in the dictionary retrieval state information management module 14 as a retrieved result (step S5). If "false" is returned from the sub-routine, the processing progresses to step S6 based on the determination in which there are no records corresponding to the node "n."

In the case of the OPEN list L1 in FIG. 14, although only the element "[Head]" can be the node "n" (step S3), the position 0 of the index 31 is examined because the node "[Head]" designates the fist index 31 of the TRIE dictionary in FIG. 11 (step S12). However, the pointer is not stored in the position 0 (not shown in FIG. 14) of the index 31, so it is determined that the corresponding record does not exist (step S15).

Next, it is checked again whether or not the pointer positioned at the node "n" in the TRIE dictionary is the pointer to the index (step S6), the following procedures in and after step S2 are repeated if this pointer is not the pointer to the index. If this pointer is the pointer to the index, child nodes for the node "n" in the lattice are developed, each child node is inserted in a suitable location of the OPEN list (step S7). Then, the following procedures in and after step S2 are repeated, and the processing terminates if the OPEN list is empty at step S2.

Here the node "[Head]" designates the index 31, the data nodes as the child nodes, such as "丈", "太" and "立" are developed, and inserted in the head position of the OPEN list, then the OPEN list becomes L2 (step S7). As the OPEN list L2 is not empty, the head element "丈" can be the node "n" (step S3), and it is checked whether or not the record corresponding to the node "丈" exists (step S4). In the TRIE dictionary in FIG. 11, the pointer included in the position of the "丈" in the index 31 points to the next index 34, accordingly the position 0 for the index 34 is examined (step S12). Here, it is identified that the pointer at the position 0 points to the record "丈" and that record is stored as the retrieved result (step S5).

Next, the data nodes "夫" and "失", which are the child nodes of the node "丈", are inserted in the OPEN list, since the pointer positioned at the node " " is the pointer to the next index 34 (step S7).

Now, there are three types of typical search methods for a tree as shown in FIG. 10: depth first search; breadth first search; and best first search. The depth first search is the method for searching in the direction toward the [Tail] from the [Head] for each branch, and the breadth first search is the method for searching all the branches in the breadth direction first, and then searching all the branches in the depth direction. The best first search is the method for searching sequentially from the branch which has the best evaluation function value, in successive order.

Figure 16:
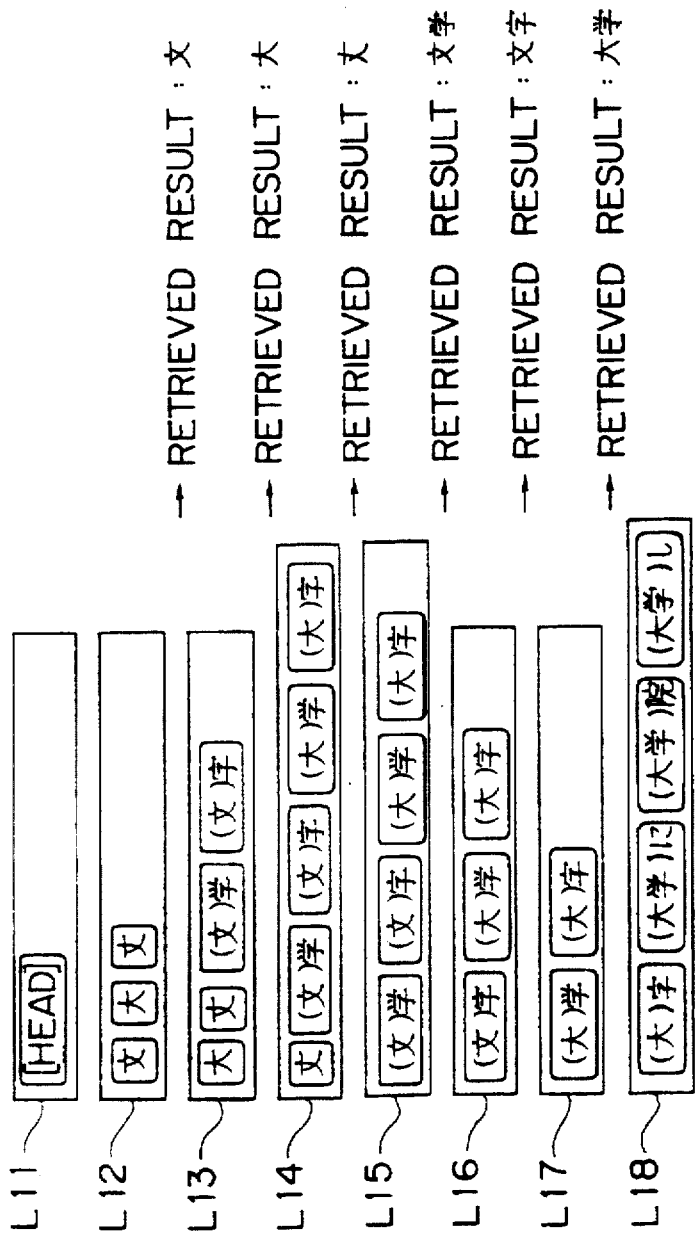
FIG. 16 is a flowchart showing a breadth first search.
Figure 17:
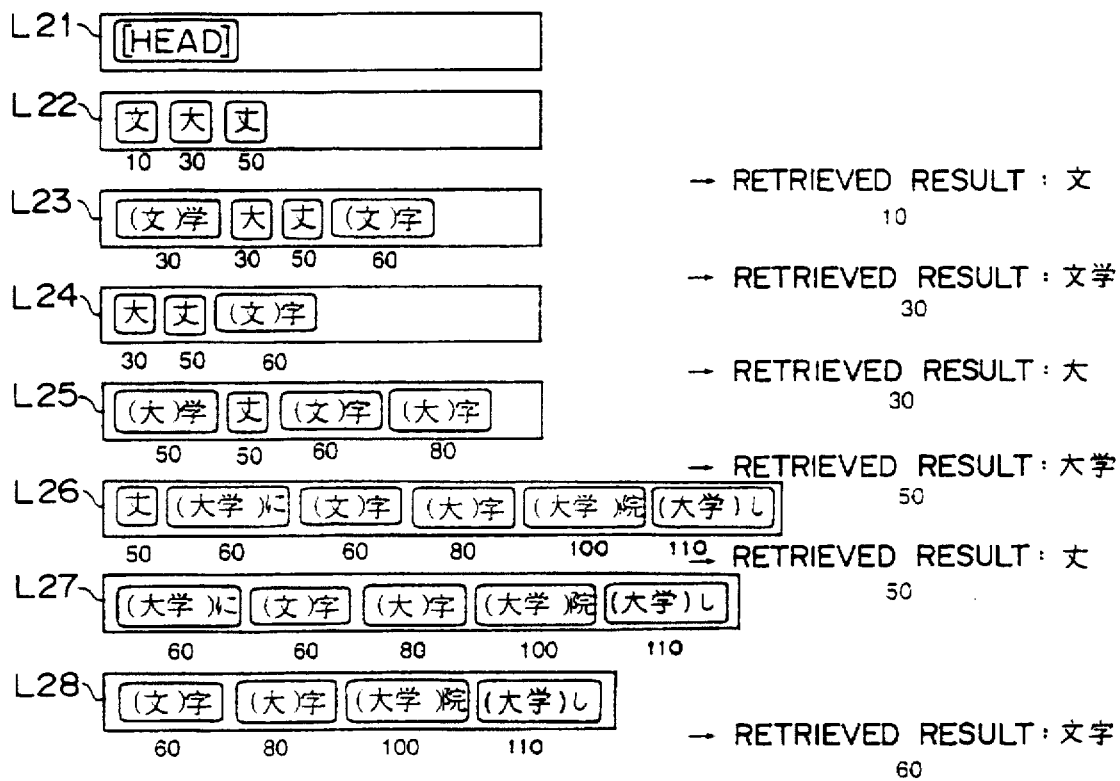
FIG. 17 is a flowchart showing a best first search.

The decision for selecting the search method among these methods depends on the position in the OPEN list for inserting the child node of the node "n" at step S7 in FIG. 13. The searching method becomes the depth first search if the child node is inserted in the head of the OPEN list, and the breadth first search if the child node is inserted in the tail of the OPEN list. Further, the best first search is implemented if the insertion position is decided according to the evaluation function value under a specific condition. An example of the OPEN lists for the depth first search is illustrated in FIG. 14. An example of the OPEN lists for the breadth first search is illustrated in FIG. 16. An example of the OPEN lists for the best first search is illustrated in FIG. 17.

To begin with, the depth first search for the tree in FIG. 10 is explained here with reference to FIG. 14. As described in the above, when the record "丈" corresponding to the element "丈" retrieved from the OPEN list L2 is stored as the retrieved result, the child nodes "夫" and "失" of the data node "丈" in FIG. 9 are developed, and are inserted in the OPEN list from the head position in successive order (step S7). Thus, the OPEN list becomes L3. In the OPEN list L3, the element "(丈)夫" as an example represents the element node corresponding to the child node "夫" developed from the parent node "丈". This type of notation is applied to the other element nodes in the same manner.

The structure of the arrangement data corresponding to the element "(丈)夫" is illustrated in FIG. 12, and the pointer to the next node points to the next element node "(丈)失" in the OPEN list L3. Further, as the latest control node ID, the control node identifier C1, which is provided in front of the data node "夫" in FIG. 9, is stored. The data node number of the latest control node represents the number which is given to the data node succeeding to the latest control node in successive order. Here, the numbers 1 and 2 are given to the data nodes "夫" and "失" to the control node C1 respectively. As a result, the data node number of the "(丈)夫" becomes 1.

As the pointer to the parent node, the pointer to the element node corresponding to the parent node "丈" in the lattice is stored. As the pointer to the TRIE dictionary, the pointer designating the position of the "夫" in the index 34 of the TRIE dictionary in FIG. 11 is stored. The evaluation function value is explained in the latter part of this specification.

For the element nodes in FIG. 12, the ID for the latest control node and the data node number for the control node are designed in order to be stored, alternatively, the pointer to the corresponding data node itself in the lattice may be stored.

Next, the node "n" is made by retrieving the "(丈)夫" from the OPEN list L3 (step S3), and the corresponding record "丈夫" is stored as the retrieved result (step S5). At this point, although the OPEN list becomes L4, a new child node will not be inserted since the pointer to the record "丈夫" has already been stored in the position corresponding to the "(丈)夫".

Next, the node "n" is made by retrieving the "(丈) 失" from the OPEN list L4 (step S3), the corresponding record "丈失" is stored as the retrieved result (step S5), and the OPEN list becomes L5. In this case, a new child node will not be inserted in the OPEN list L5, since the pointer to the next index has not yet been stored in the position corresponding to the "(丈) 失".

Next, the node "n" is made by retrieving a "太" from the OPEN list L5 (step S3), and the corresponding record "太" is stored as the retrieved result (step S5). At this point, the pointer to the next index 32 is stored in the position corresponding to the "太" accordingly, the nodes such as a "太夫" and a "(太) 失" as the child nodes of the "太" are inserted in the head position of the OPEN list (step S7). As a result, the OPEN list becomes L6.

Next, the node "n" is made by retrieving the "(太) 失" from the OPEN list L6 (step S3), and the corresponding record "太失" is stored as the retrieved result (step S5). The pointer to the next index 33 is stored in the position corresponding to the "(太) 失" accordingly the nodes such as "(太失) に", "(太失) 阪" and "(太失) し" as the child nodes of the "(太) 失" are inserted in the head position of the OPEN list (step S7). As a result, the OPEN list becomes L7.

Next, although the node "n" is made by retrieving the "(大学) に" from the OPEN list L7 (step S3), the retrieved result cannot be obtained because the index corresponding to the TRIE dictionary cannot be found. As a result, the OPEN list becomes L8. Next, the "(大学) 院" of the OPEN list L8 can be the node "n" (step S3), and the corresponding record "大学院" is stored as the retrieved result (step S5). In this way, the element nodes of the OPEN list are processed, and the retrieval processing terminates when the OPEN list is empty.

Next, the breadth first search for the tree in FIG. 10 is explained with reference to FIG. 16. In the case of the breadth first search, the developed child node is inserted in the tail of the OPEN list in step S7 in FIG. 13. The processing in which OPEN lists L11 and L12, in FIG. 16, are generated is identical to the processing for the OPEN lists L1 and L2 in FIG. 14.

When the record "文" becomes the retrieved result (step S5) by retrieving the "文" from the OPEN list L12 (step S3), then its child nodes such as "文 (学)" and "(文) 学" are inserted in the tail of the OPEN list (step S7). As a result, the OPEN list becomes L13. Further, the "大" is retrieved from the OPEN list L13 (step S3), the record "大" becomes the retrieved result (step S5), and its child nodes such as "(大) 学" and "(大) 学" are inserted in the tail of the OPEN list (step S7). As a result, the OPEN list becomes L14.

Next, the "文" is retrieved from the OPEN list L14 (step S3), and the record "文" becomes the retrieved result (step S5). As a result, the OPEN list becomes L15. However, there are no indexes for the "文" in the TRIE dictionary, accordingly, new child nodes cannot be inserted. In the same way, the OPEN list changes to L16 and L17 without an increase in the element nodes. Then, the records "文学" and "文学" become the retrieved results.

Next, the record "大学" becomes the retrieved result (step S5) by retrieving the "(大) 学" from the OPEN list L17 (step S3), then its child nodes such as "(大学) に", "(大学) 院" and "(大学) し" are inserted in the tail of the OPEN list (step S7). As a result, the OPEN list becomes L18. In such a way, the element nodes in the OPEN list are processed, and the retrieval processing terminates when the OPEN list is empty.

Next, the best first search for the tree in FIG. 10 is explained with reference to FIG. 17. For the best first search, the insertion positions for the developed child nodes are determined based on the evaluation function value calculated by the evaluation function module 16 at step S7 in FIG. 13. Accordingly, to begin with, the evaluation function will be explained here.

The evaluation function value of the data node in the lattice is calculated based on a path (the sequence of the data nodes) from the node "[Head]" to the data node, information obtained during the retrieval method up to the data node, and so on. To put it specifically, the calculation is made based on the data node number for the path, for example, and the attribute of each data node, and the attribute uses a character type, ranking, and recognition distance value of the data node.

When the evaluation function value increases monotonically as a path becomes longer, this type of evaluation function is called monotonically increasing function. As examples of the monotonically increasing evaluation function value, there are the total value of the recognition distance value of the data node in the path, and the number of data nodes whose recognition distance values are greater than a specific value.

When the evaluation function is monotonically increasing function, for inserting the child nodes of the node "n" in the OPEN list at step S7 in FIG. 13, the best first search is realized by inserting the child nodes in order for the element node in the OPEN list to be arranged in order of better evaluation function value. Namely, in this search method, the tree search is implemented in order of better function value node order. Each tree node corresponds to each retrieval key of the TRIE dictionary, and the evaluation function value for the node can be the evaluation function value of the corresponding retrieval key character strings. Accordingly, for the dictionary retrieval, the retrieval is implemented in order of better evaluation function value for the retrieval key, and the retrieved result record is fetched in this order.

In the best first search method in FIG. 17, the evaluation function module 16 uses the sum of the recognition distance values given to each data node for the path and calculates its value. Further, the dictionary retrieval control module 13 stores the calculated value in the dictionary retrieval state information management module 14 as the corresponding node evaluation function value of the OPEN list. Further, the smaller the evaluation function value is, the better it is.

The processing in which the OPEN lists L21 and L22 are developed in FIG. 17 is identical to the processing in which the OPEN lists L1 and L2 are developed in FIG. 14. However, the element nodes, such as "文", "大" and "文" are stored in order of smaller evaluation function values written under the element nodes.

Next, when the record "文" becomes the retrieved result (step S5) by retrieving the "文" from the OPEN list L22 (step S3), its child nodes such as the "(文) 学" and the "(文) 学" are developed. Here, the evaluation function value of the "(文) 学" becomes 30 based on the recognition distance value of the data nodes such as the "文" and the "学" in (FIG. 9, and the evaluation function value of the "(文) 学" becomes 60 based on the recognition distance value of the data nodes such as the "文" and the "学".

This kind of the evaluation function value is compared with the evaluation function values of the element nodes such as the "大" and the "文", then the "(文) 学" is inserted in the top of the OPEN list and the "(文) 学" is inserted in the tail of the OPEN list (step S7). As a result, the OPEN list becomes L23.

Next, the record "文学" becomes the retrieved result (step S5) by retrieving the "(文) 学" from the OPEN list L23 (step S3), and the OPEN list becomes L24.

Next, the record "大" becomes the retrieved result (step S5) by retrieving the "大" from the OPEN list L24 (step S3), then its child nodes such as the "(大) 学" and the "(大) 学" are inserted in the positions corresponding to their respective evaluation function values 50 and 80 (step S7). As a result, the OPEN list becomes L25.

Next, the record "大学" becomes the retrieved result (step S5) by retrieving the "(大) 学" from the OPEN list L25 (step S3), then its child nodes "(大学) に", "(大学) 院" and "(大学) し" are inserted in positions according to the evaluation function values 60, 100 and 110 (step S7). As a result, the OPEN list becomes L26.

In the same way, the OPEN list changes to L27 and L28, and the records such as the "文" and the "文学" become the retrieved result successively. In this way, the processing for the element nodes in the OPEN list is implemented, and the retrieval processing terminates if the OPEN list becomes empty. According to the retrieved result in FIG. 17, we can understand that the records are retrieved in order of better evaluation function value.

Next, other retrieval processing is explained with reference to FIGS. 18 to 23.

In the retrieval processing algorithm in FIG. 13, information for the retrieval progression state is included in the dictionary retrieval state information 15 containing the OPEN list and the retrieved result, and the retrieval can be restarted if there is the dictionary retrieval state information 15 for the retrieval halt. Accordingly, when there is the record corresponding to the node "n" in the TRIE dictionary at step S4 in FIG. 13, the retrieved result may be output with the dictionary retrieval state information 15. The retrieval can be restarted based on the dictionary retrieval state information 15 after the retrieval halt, if necessary.

Figure 18:
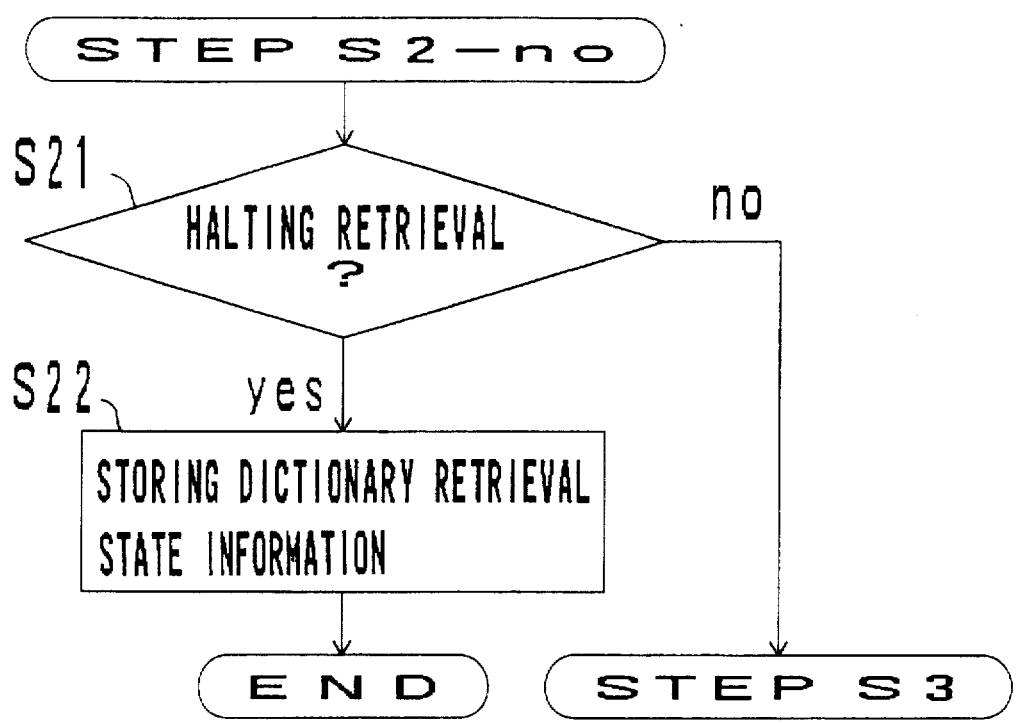
FIG. 18 is a flowchart showing a retrieval halt processing.

FIG. 18 is a flowchart showing processing for halting the first retrieval processing partway. When the OPEN list is not empty at step S2 in FIG. 13, the dictionary retrieval control module 13 outputs the retrieved result obtained at that time and inquires of an operator whether or not the retrieval processing should be halted (step S21).

If a retrieval halt is instructed by the operator, the processing terminates while data for all the element nodes retrieved from the OPEN list and each element node in the OPEN list are stored in the dictionary retrieval state information 15 (step S22). Further, when a retrieval processing continuation is instructed by the operator, the procedures in and after step S3 in FIG. 13 are implemented.

In the best first search, the records are retrieved in smaller evaluation function value order, accordingly only the records having evaluation function values equal to or smaller than a specific value can be output as the retrieved result, by halting the retrieval processing partway. As a result, better candidate character strings can be obtained in a short time, and the effective retrieval processing can be implemented.

Figure 19:
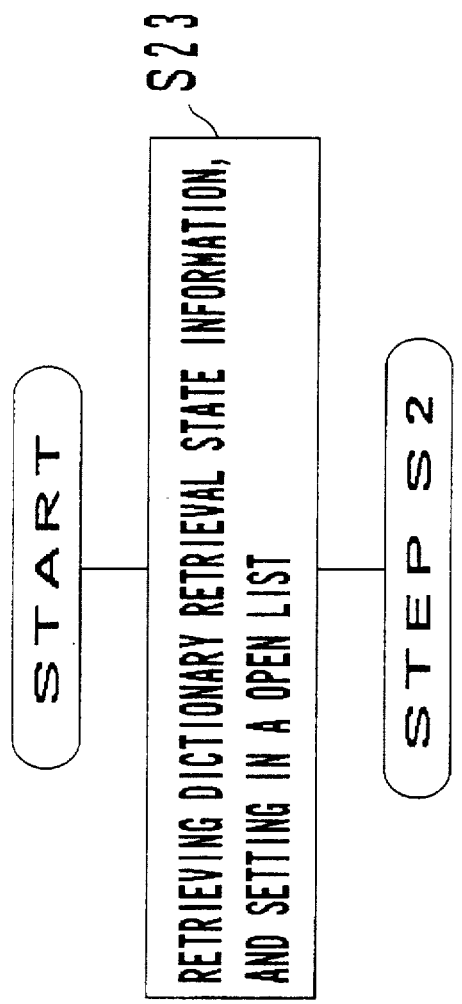
FIG. 19 is a flowchart showing the retrieval restart processing.

FIG. 19 is a processing flowchart showing the first retrieval processing restart after it has once been halted. In FIG. 19, when the processing is started, to begin with, the dictionary retrieval control module 13 retrieves the stored dictionary retrieval state information 15, then the state in which a halt has been made is reset in the OPEN list (step S23). Then, the following procedures in and after step S2 are implemented. These types of halt and restart procedures for the retrieval processing can be implemented whenever the occasion demands.

Now, when the evaluation function value of the retrieved record is greater than the specific value, in general, the evaluation for the record is not good and the evaluation function value mostly cannot be adopted as the recognized result. Thus, regardless of whether or not the evaluation function is the monotonically increasing, the effective retrieval processing can be possible by returning a record whose evaluation function value is equal to or less than a specific value, as a retrieved result.

Figure 20:
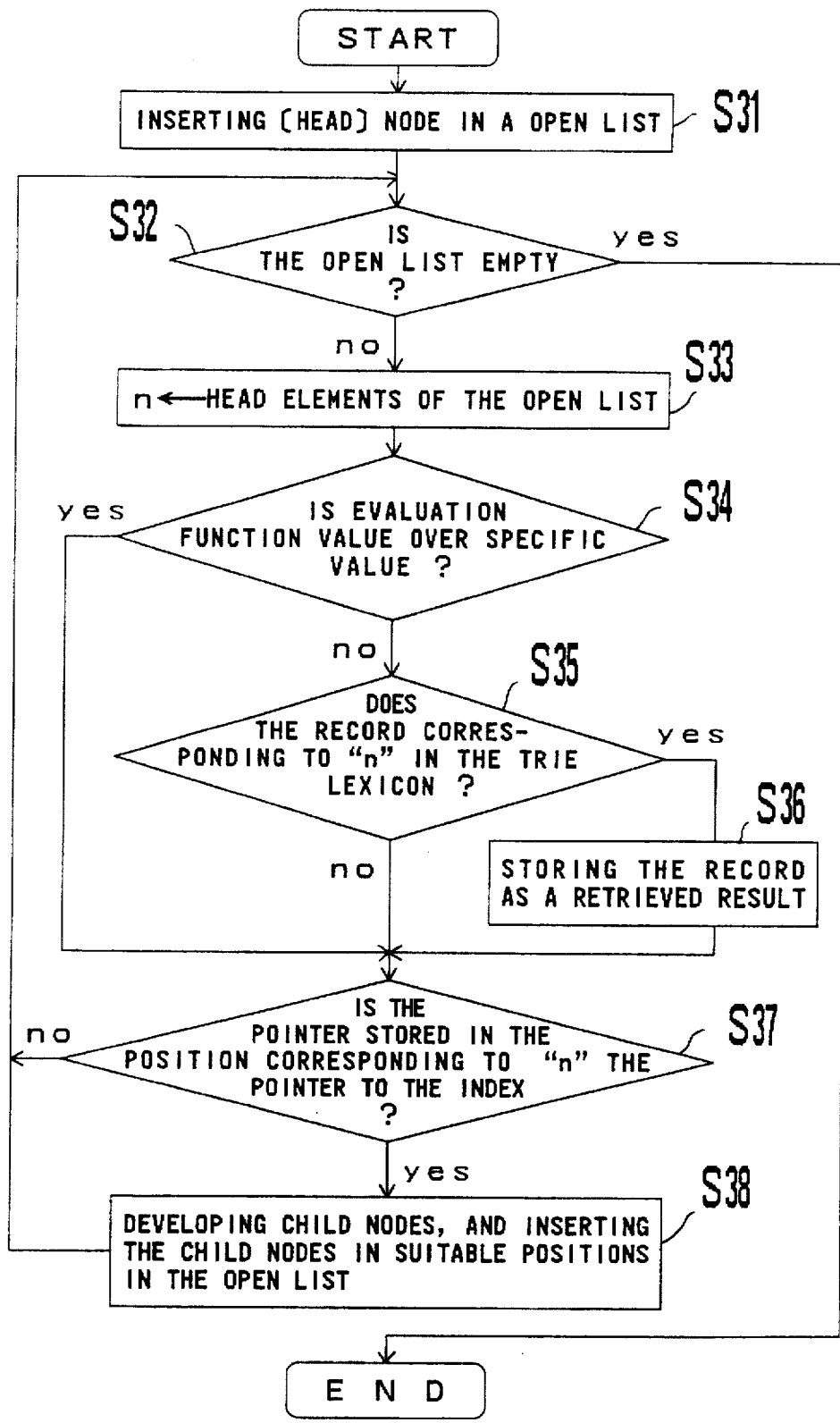
FIG. 20 is a flowchart showing the second retrieval processing.

FIG. 20 is a flowchart showing this type of the second retrieval processing. In FIG. 20, when the processing is started, the dictionary retrieval control module 13 inserts the data node "[Head]" of the lattice in the OPEN list (step S31). Next, it is checked whether or not the OPEN list is empty (step S32), and the head element node in the OPEN list becomes the node "n" (step S33) if not empty. Then, it is checked whether or not the evaluation function value for the node "n" is greater than the predetermined specific value (step S34).

If the evaluation function value is not greater than the specific value, then it is checked whether or not the record corresponding to the node "n" exists in the record area 35 in the TRIE dictionary (step S35), and the processing at step S37 is implemented without checking the existence of the corresponding record if the evaluation function value is greater than the specific value.

The record checking procedure at step S35 is implemented by the subroutine of FIG. 15. When the "true" is returned from the subroutine, the dictionary retrieval control module 13 retrieves the record from the record area 35 by using the pointer to the record corresponding to the node "n," then the record is stored in the dictionary retrieval state information management module 14 as the retrieved result (step S36). If "false" is returned from the subroutine, the procedure at step S37 is implemented by determining that the record corresponding the node "n" does not exist.

Next, it is checked whether or not the pointer positioned at the node "n" in the TRIE dictionary is the pointer to the index (step S37), the following procedures in after step S32 are repeated if it is not the pointer to the index. If the pointer positioned at the node "n" is the pointer to the index, the child nodes of the node "n" in the lattice are developed, and each child node is inserted in a suitable location of the OPEN list according to the evaluation function value (step S38). Then, the following procedures in and after step S32 are iterated, and the processing terminates at step S32 if the OPEN list is empty.

According to this type of the second retrieval processing, the processing can be implemented up to the end with getting only the records having relatively better evaluation function values as the retrieved result, and the decision for the recognition result thereafter can be made efficiently. Here, at step S34, the procedure at step S37 can be designated to be implemented when the evaluation function value is equal to or greater than the specific value.

In the second retrieval processing, when the evaluation function is the monotonically increasing, the implementation of the dictionary retrieval becomes unnecessary since the evaluation function value no longer becomes better for the following partial trees, if the evaluation function value of one node is equal to or greater than, or exceeds the specific value. In such case, the pruning determination module 17 determines that partial tree pruning is possible, accordingly, the dictionary retrieval control module 13 terminates the retrieval processing for the partial tree.

Thus, the partial tree pruning, for which the evaluation function value cannot be expected to improve, is implemented, and the dictionary retrieval is implemented efficiently. After that, the dictionary retrieval control module 13 continues to retrieve the rest of the trees, and only the records having relatively better evaluation function values can be the retrieved result.

FIG. 21 is the third retrieval processing flowchart for implementing this type of pruning. In FIG. 21, when the processing is started, to begin with, the dictionary retrieval control module 13 inserts the data node "n" of the lattice in the OPEN list (step S41). Next, it is checked whether or not the OPEN list is empty (step S42), and the head element node in the OPEN list becomes the node "n" if it is not empty (step S43).

Here, the pruning determination module 17 checks whether or not the evaluation function value is over the predetermined specific value (step S44). Further, it is determined that the pruning is impossible if the evaluation function value is not over the specific value, or it is determined that the pruning is possible if it is over the specific value, and the determined result is given to the dictionary retrieval control module 13.

In the case it is not possible to prune, the dictionary retrieval control module 13 checks whether or not the record corresponding to the node "n" exists in the record area 35 in the TRIE dictionary (step S45). The record checking procedure at step S45 is implemented by the subroutine in FIG. 15.

If "true" is returned from the subroutine, the dictionary retrieval control module 13 retrieves the record from the record area 35 by using the pointer to the record corresponding to the node "n," then the record is stored in the dictionary retrieval state information management module 14 as the retrieved result (step S46). If "false" is returned from the subroutine, it is determined that the record corresponding to the node "n" does not exist, and the procedure at step S47 is implemented.

Next, it is checked that the pointer positioned at the node "n" in the TRIE dictionary is the pointer to the index (step S47), and the procedures in and after step S42 are iterated if it is not the pointer to the index. If the pointer positioned at the node "n" is the pointer to the index, the child nodes of the node "n" in the lattice are developed, and each child node is inserted in a suitable location of the OPEN list according to the evaluation function value (step S48). Then, the following procedures in and after step S42 are iterated.

When the evaluation function value is over the specific value at step S44 and it is determined that the pruning is possible, the procedure at step S42 is re-implemented without developing the child nodes and checking the record. According to these procedures, the search for the node "n" and the child nodes is halted, and the pruning is implemented. Then, the next element node is retrieved from the OPEN list, and the procedures in and after step S43 are iterated, and the processing terminates if the OPEN list is empty at step S42.

For the case in which the evaluation function value is the monotonically increasing, the retrieved result having a relatively better evaluation function value can be obtained with higher speed than with the second retrieval processing. Here, at step S44, the processing at step S42 can be re-implemented when the evaluation function value is equal to or greater than the specific value.

Figure 22:
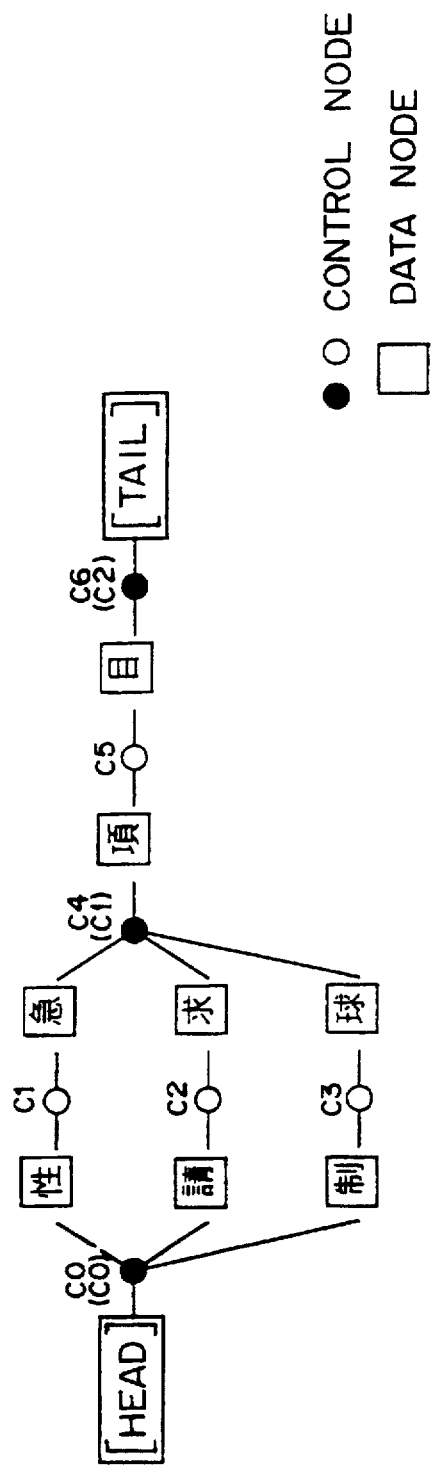
FIG. 22 is a flowchart showing the third retrieval processing for proofreading support.

FIG. 22 illustrates the third character lattice used in proofreading support processing. In the proof reading support processing, the dictionary retrieval using the lattice in order to proof wrong characters contained in an already existing sentence is implemented.

In the character lattice in FIG. 22, for the word of "性急項目" contained in the original sentence, three types of homonym information for "性急", "請求", and "制球" which have the same pronunciation of "Sei Kyuu," are included. When all of these words are divided into the data nodes based on character unit dividing, the control nodes become the seven nodes represented by black spots and white spots, such as C0, C1, C2, C3, C4, C5, and C6. The dictionary retrieval unit 11 determines the possibility of original word error based on the word information of the "請求項目" in the TRIE dictionary and the homonym information in the character lattice.

Here, in this example, it is possible to divide in advance "性急,項目" into two words of "性急" and "項目" accordingly, the dictionary does not need to be retrieved in smaller character units for each of words such as "性急", "請求" and "制球". Accordingly, wasteful processing returning unnecessary retrieved results from the TRIE dictionary can be excluded by marking a part of control nodes as being an unnecessary retrieval.

In FIG. 22, this type of unnecessary retrieval control node is indicated by the white spot, and an identifier does not need to be added for this type of node. Accordingly, when the identifier is re-added for the control nodes indicated by the black spots, then the control nodes such as C0, C1, and C2 as indicated inside "( )" are obtained.

To distinguish the control node, which will be used for this type of the retrieval, from the unnecessary node, dictionary retrieval condition information is added to the data arrangement of the control node in FIG. 7. Further, the dictionary retrieval condition information is marked with the information of being an unnecessary retrieval, then the dictionary retrieval control module 13 implements the retrieval processing with skipping of those control nodes.

Figure 23:
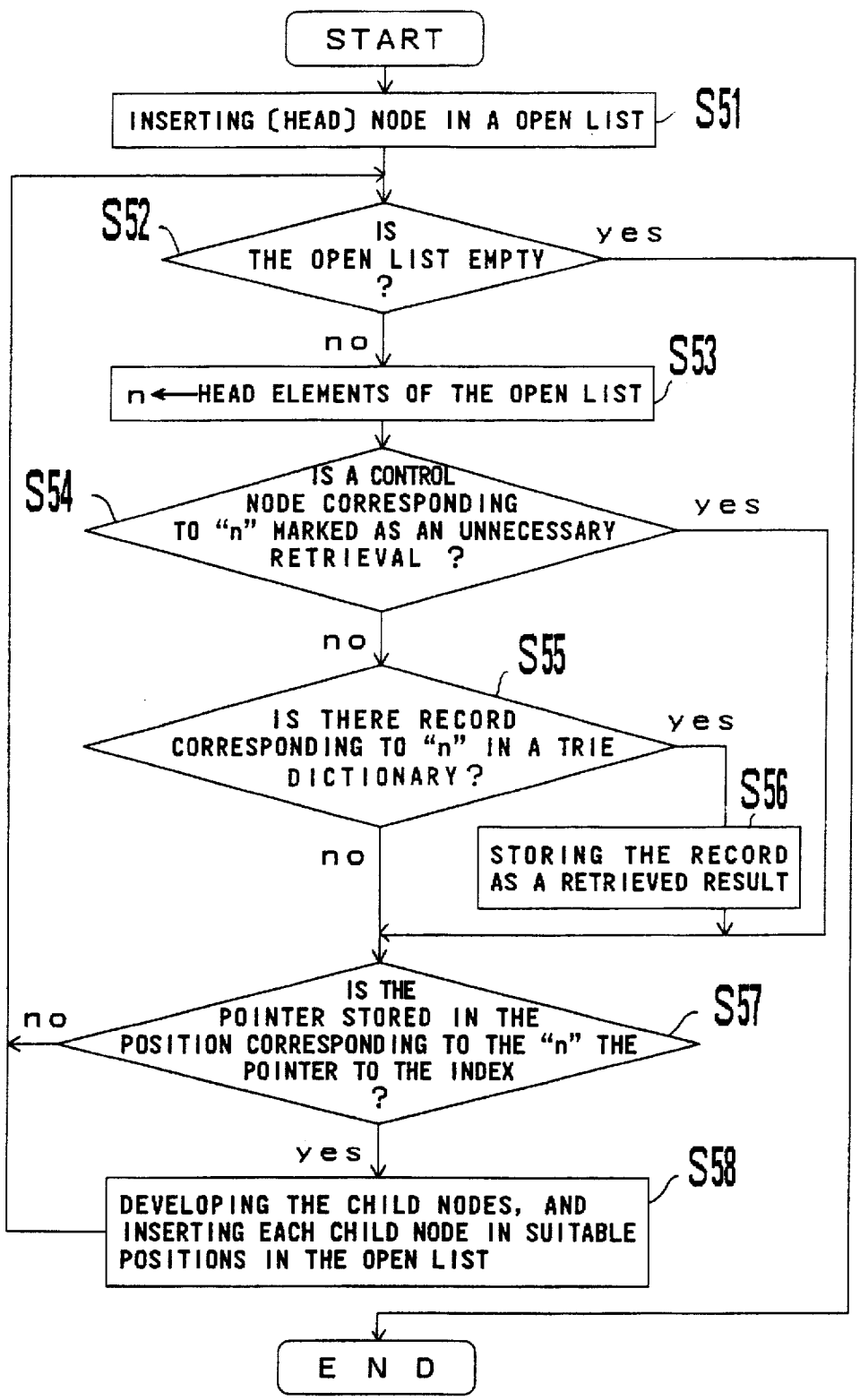
FIG. 23 is a flowchart showing the fourth retrieval processing.

FIG. 23 is a flowchart showing the fourth retrieval processing using the dictionary retrieval condition information. In FIG. 23, when the processing is started, the dictionary retrieval control module 13 inserts the data node "[Head]" of the lattice in the OPEN list (step S51). Next, it is checked whether or not the OPEN list is empty (step S52), and the head element node in the OPEN list becomes the node "n" if it is not empty (step S53).

Next, it is checked whether or not the control node corresponding to the node "n" is marked with the information indicating an unnecessary retrieval (step S54). Here, the dictionary retrieval condition information for the control node succeeding the node "n" is checked. If there is no marking with the information indicating an unnecessary retrieval, then it is checked whether or not the record corresponding to the node "n" exists in the record area of the TRIE dictionary (step S55), and the processing at step S57 is implemented without checking the existence of the corresponding record if there is such marking.

The record checking processing at step S55 is implemented by the subroutine in FIG. 15. If "true" is returned from the subroutine, the dictionary retrieval control module 13 retrieves the record from the record area by using the pointer to the record corresponding to the node "n," and stores the retrieved record in the dictionary retrieval state information management module 14 as the retrieved result (step S56). If "false" is returned from the subroutine, it is determined that the record corresponding to the node "n" does not exist, and the processing at step S57 is implemented.

For example, when the data node " " in FIG. 22 becomes the node "n," the dictionary retrieval condition information of the subsequent white spot control node C1 is investigated (step S54). Since the control node C1 is marked as being an unnecessary retrieval, the corresponding record retrieval is not implemented.

Next, it is checked whether or not the pointer positioned at the node "n" in the TRIE dictionary is the pointer to the index (step S57), the procedures in and after S52 are iterated if it is not the pointer to the index. If the pointer positioned at the node "n" is the pointer to the index, the child nodes of the node "n" in the lattice are developed, and each child node is inserted in a suitable location of the OPEN list (step S58). Then, the procedures in and after S52 are iterated, and the processing terminates if the OPEN list is empty at step S52.

At S57, when the pointer corresponding to the node "性" in the TRIE dictionary is the pointer to the next index, the child node "急" of the "性" is inserted in the OPEN list(step S58). Then, when the node "(性) 急" is the node "n" (step S53), the corresponding record retrieval is implemented (step S55) since the corresponding black spot control node C4 is not marked.

In the same way, when the element nodes such as "請", "制", "(性急) 項", "(請求) 項" and "(制球)項" become the node "n," the record retrieval is not implemented. However, when the "(請) 求", "(制) 球", "(性急項) 目", "(請求項) 目" and "(制球項) 目" become the node "n", the corresponding record is retrieved.

Based on this type of the fourth retrieval processing, the proof reading for the already existing sentence can be implemented efficiently according to the condition described in the lattice control node.

Next, the character recognition processing is explained with reference to FIGS. 24 to 29, based on an example of an English original image.

Figure 24:
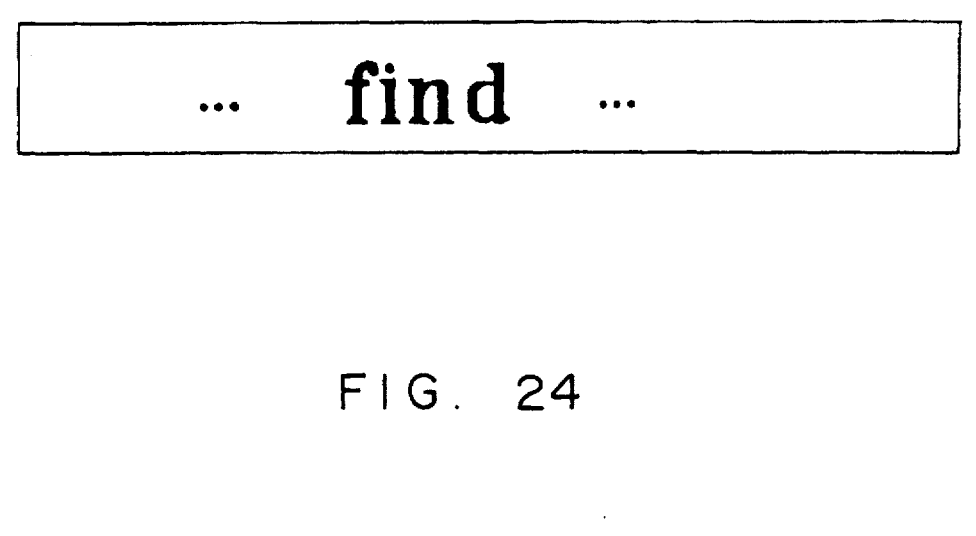
Figure 26:
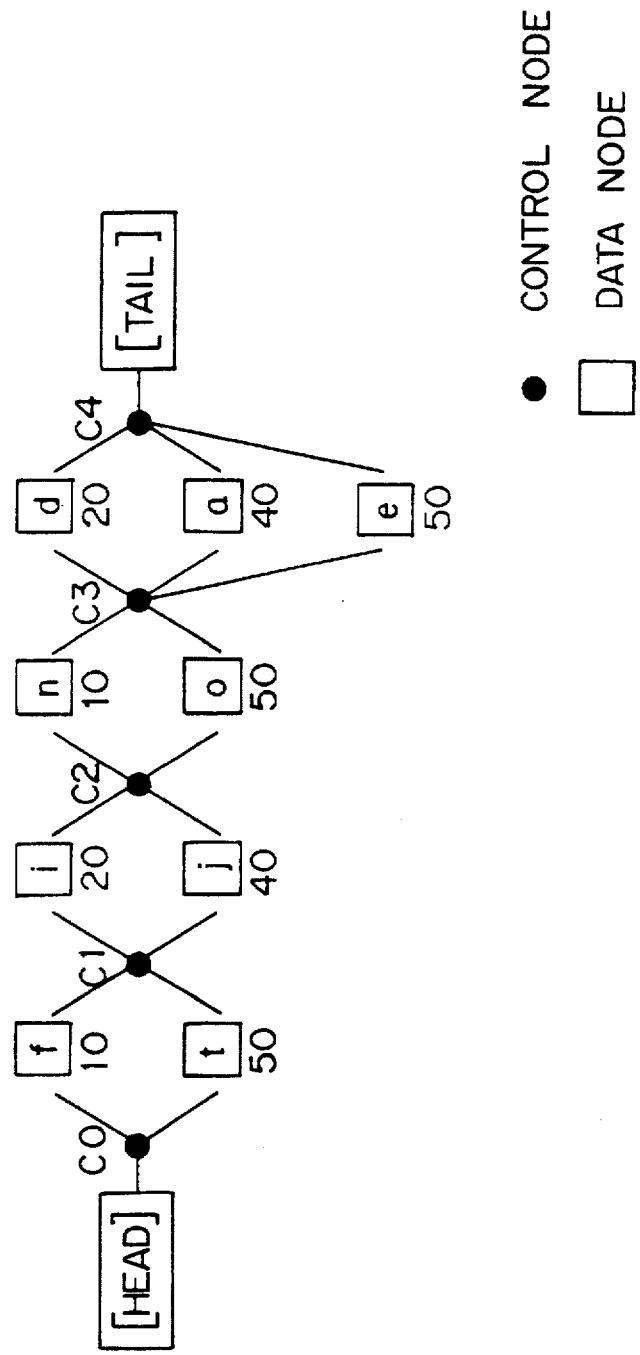
FIG. 26 illustrates the fourth character lattice.

FIG. 24 is the example of the original image of an English word as the recognition target. When the character recognition for the original image "find" in FIG. 24 is implemented, the character lattice, for example in FIG. 25, is obtained if there is no character boundary setting error. FIG. 26 is the character lattice represented by the data node and the control node.

In the fourth character lattice in FIG. 26, the data nodes such as the "[Head]" and "[Tail]" are added for the processing convenience, in a similar manner to the first character lattice in FIG. 6. Further, the numerals written under each data node represent the recognition distance value, and the control nodes such as C0, C1, C2, C3, C4, and C5 are inserted among the data nodes.

Figure 27:
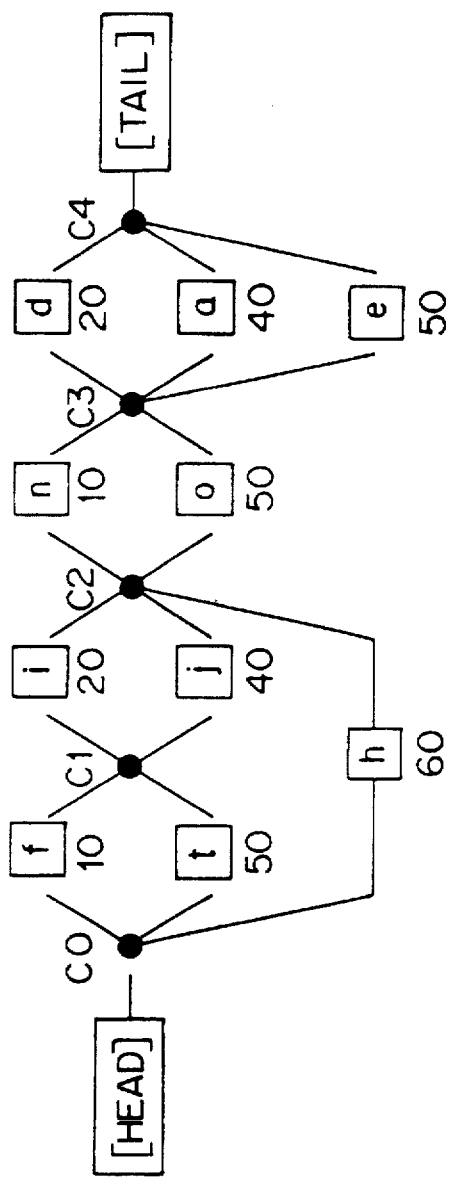
FIG. 27 illustrates the fifth character lattice in which a boundary setting error is contained.

FIG. 26 is the fourth character lattice which has no character boundary setting error. When there is a character boundary setting error, graph types of data as shown in FIG. 27, for example, can be obtained. When the fifth character lattice in FIG. 27 is compared with the fourth character lattice in FIG. 26, a candidate character "h" is inserted between the control nodes C0 and C2. This is the case in which the boundary setting is made by treating the character string "fi" as one character.

The dictionary retrieval control module 13 implements the dictionary retrieval by traversing each node of the character lattice as shown in FIG. 26 and 27.

Figure 28:
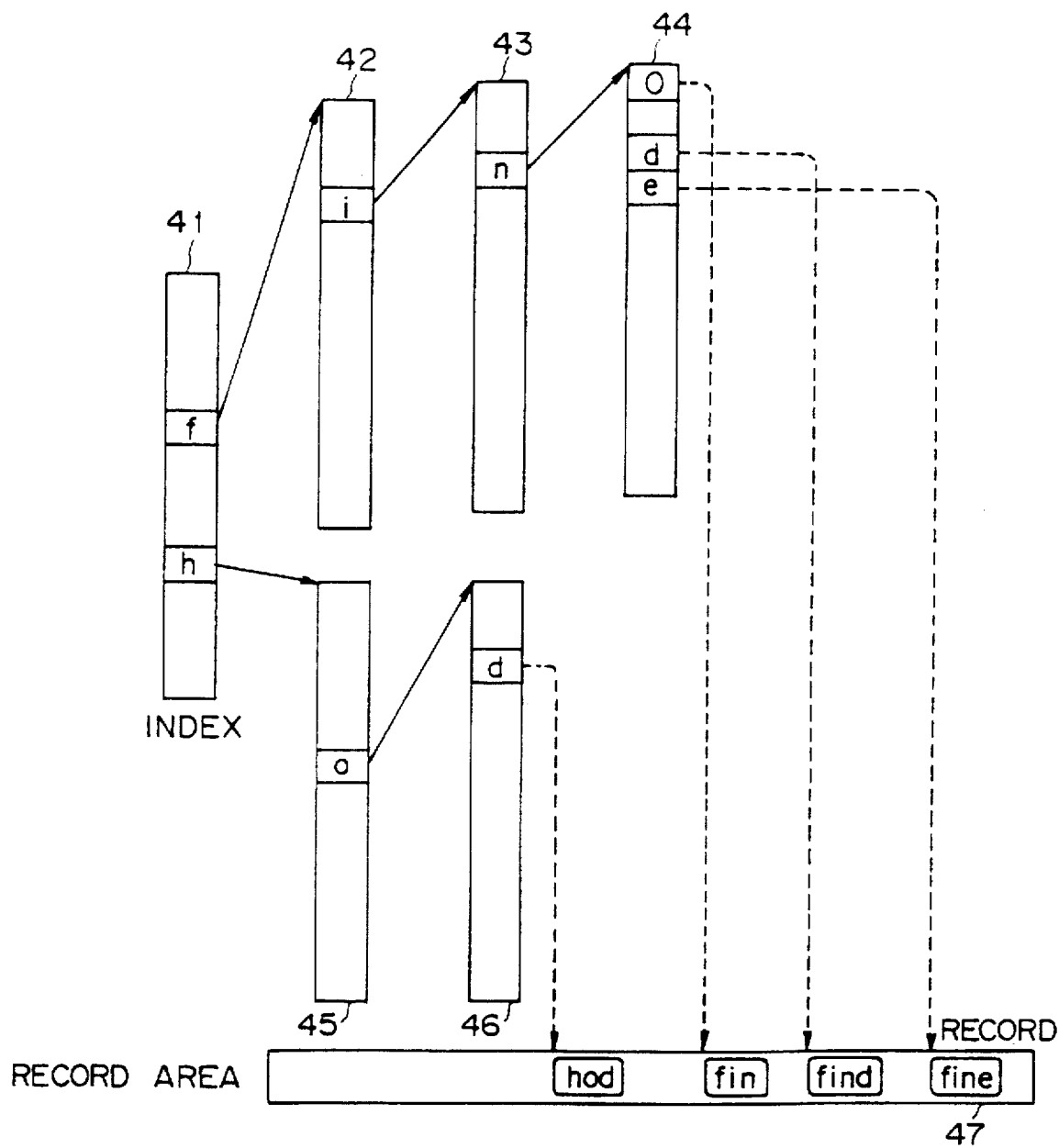
FIG. 28 illustrates a TRIE dictionary of an English word.

FIG. 28 is the TRIE dictionary structure having the retrieval key obtained from the character lattice in FIG. 27. In the TRIE dictionary in FIG. 28, the record in record area 47 is represented by a pair of data composed of information representing a word itself and a part of speech. For example, a record "hod" is composed of data representing the word "hod" and data representing a noun, and a record "find" is composed of data representing the word "find" and data representing a verb and noun.

In the position of "f" and "h" in an index 41, the pointers to the next indexes 42 and 45 are stored respectively. In the same manner, in the positions of "i," "n," and "o" in the indexes 42, 43, and 45, the pointers to the next indexes 43, 44, and 46 are stored.

Further, in the top position 0 of an index 44, the pointer to the record "fin" is stored. In the positions of "d" and "e," the pointers to records "find" and "fine" are stored. Further, in the position of "d" of an index 46, the pointer to the record "hod" is stored.

Figure 29:
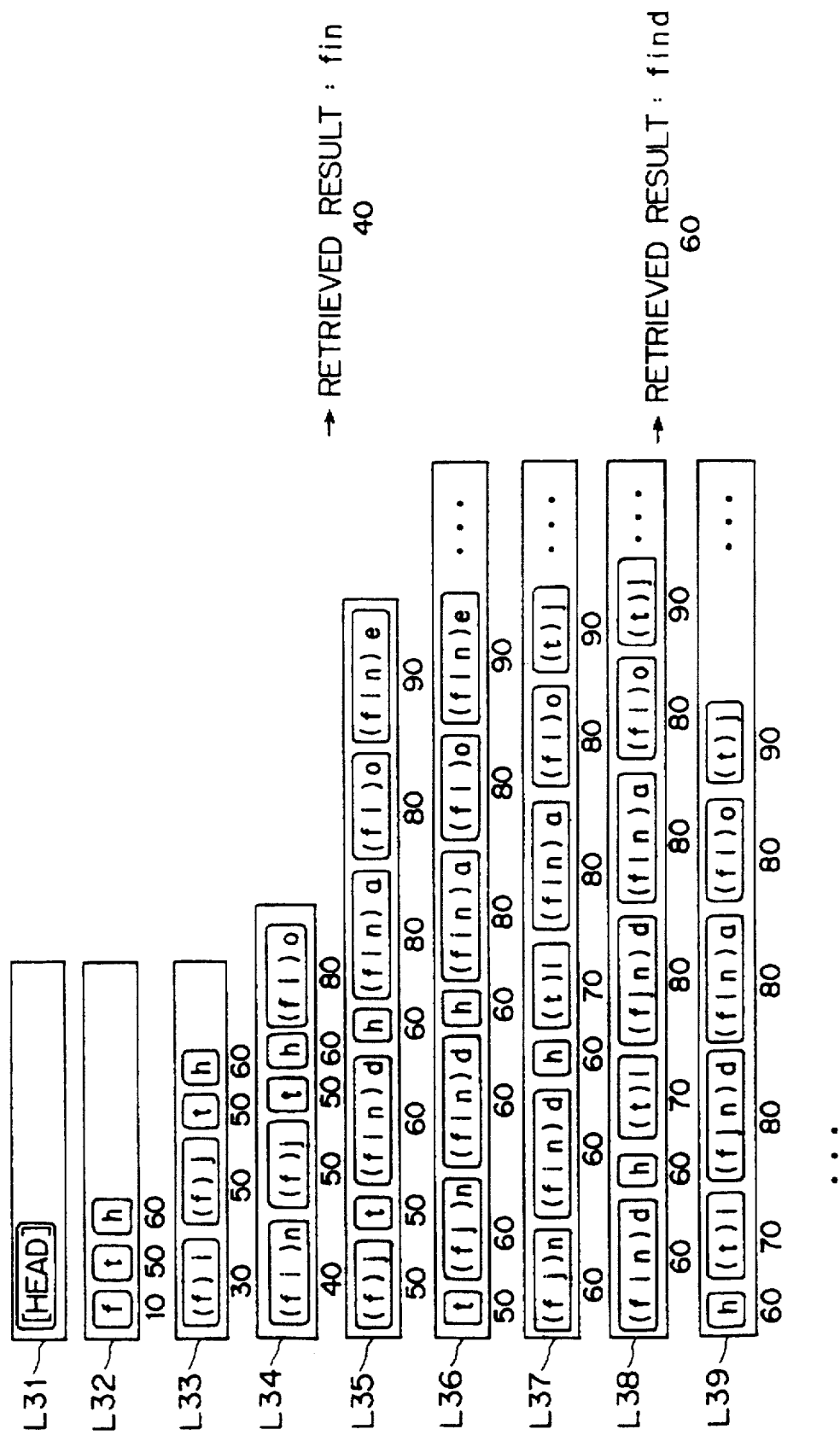
FIG. 29 illustrates OPEN lists for an English word in the best first search.

FIG. 29 illustrates OPEN list changes when the best first search in the TRIE dictionary, in FIG. 28, is implemented by using the character lattice in FIG. 27 as the key. The best first search is implemented according to the flowchart of the first retrieval processing in FIG. 13, the child node insertion position is determined based on the evaluation function value represented by the sum of the recognition distance values. The numerals described below each element of the OPEN lists in FIG. 29 represent the evaluation function value for each node.

In FIG. 29, the processing in which the OPEN list L31 is generated is the same way to the case of the OPEN list L1 in FIG. 14. Next, when the "[Head]" is retrieved from the OPEN list L31 (step S3), the child nodes "f," "t," and "h" are stored in order of smaller evaluation function value (step S7), then the OPEN list becomes L32.

Next, when the "f" is retrieved from the OPEN list L32 (step S3), the child nodes "(f)i" and "(f)j" are developed. Here, the evaluation function value of "(f)i" becomes 30 based on the recognition distance values of the data nodes "f" and "i" in FIG. 27, while the evaluation function value of "(f)j" becomes 50 based on the recognition distance values of the data nodes "f" and "j."

After the above described values are compared with the evaluation function values of the remaining element nodes "t" and "h," the "(f)i" and "(f)j" are inserted in the top of the OPEN list (step S7). As a result, the OPEN list becomes L33.

Next, when the "(f)i" is retrieved from the OPEN list L33 (step S33), its child nodes "(fi)n" and "(fi)o" are inserted in the positions corresponding to evaluation function values 40 and 80 (step S7). As a result, the OPEN list becomes L34.

Next, the "(fi)n" is retrieved from the OPEN list L34 (step S34), the record "fin" becomes the retrieved result (step S5), then its child nodes such as "(fin)d," "(fin)a," and "(fin)e" are inserted in the positions corresponding to their evaluation function values 60, 80, and 90 (step S7). The OPEN list becomes L35.

In the same way, the OPEN list changes to L36, L37, L38, and L39, and the record "find" becomes the next retrieved result. Thus, the element nodes in the OPEN list are processed, and the retrieval processing terminates if the OPEN list becomes empty. In the retrieved result shown in FIG. 29, the records are obtained in order of better evaluation function value.

In the above described preferred embodiment, the Japanese and English character recognition processing and proofreading support processing are explained primarily. The dictionary retrieval processing of the present invention is also applied to other processing, such as voice recognition, and so on. Further, as a language composing the dictionary, any language such as Chinese, Korean, French, German, and so on can be used, and there is no problem if symbols and graphics are included in the character strings of the retrieved result.

Moreover, the evaluation function in which the bigger its value in the retrieved result, the more the certainty is, can be used, although there is the above described case, for the search based on the evaluation function, that the smaller the value of the evaluation function in the retrieved result, the more the certainty is. In this case, the element nodes can be sorted in order of larger evaluation function value in the OPEN list. At step S34 in FIG. 20 and step S4 in FIG. 21, it is sufficient to check whether or not the evaluation function value of the node "n" is less than the specific value.

Further, the retrieval processing using the OPEN list is merely used as an example, accordingly, the next child nodes in the lattice can be developed using other arbitrary methods.

According to the present invention, the TRIE dictionary can be retrieved efficiently by using the given lattice structured data as the key, accordingly, the processing which needs the dictionary retrieval, such as the character recognition and the voice recognition, can be implemented with high speed. As a result, the inputting efficiency, such as character input, voice input, and so on, can be improved.

What is claimed is:

1. A dictionary retrieval apparatus for retrieving a Tree Retrieval dictionary by using a given retrieval key and outputting a retrieved result, comprising:

complex-key management means for managing information of a complex-key which includes plural data nodes combined organizationally and contains at least two retrieval keys;

retrieval means for retrieving a corresponding record in said Tree Retrieval dictionary by accessing said data nodes in said complex-key;

retrieval condition memory means for storing information, which indicates a position of an accessed data node in said complex-key, and a retrieval result obtained from said retrieval means; and output means for outputting said retrieval result.

2. The dictionary retrieval apparatus according to claim 1, wherein said complex-key management means manage information of said complex-key including data nodes corresponding to candidate characters for a recognition result of character recognition.

3. The dictionary retrieval apparatus according to claim 1, wherein said complex-key management means manage information of said complex-key including data nodes corresponding to candidate phonemes for a recognition result of voice recognition.

4. The dictionary retrieval apparatus according to claim 1, wherein said complex-key management means manages information of said complex-key including a control node representing a connection relationship between a first data node and a second data node in said plural data nodes.

5. The dictionary retrieval apparatus according to claim 4, wherein said complex-key management means manage said information by adding dictionary retrieval condition information indicating whether or not retrieval is necessary to said control node and said retrieval means does not retrieve said corresponding record in said Tree Retrieval dictionary for a data node corresponding to said control node when said dictionary retrieval condition information indicates an unnecessity.

6. The dictionary retrieval apparatus according to claim 1, wherein said complex-key management means manage lattice structured data, in which said plural data nodes are combined in a lattice shape, as said information of said complex-key.

7. The dictionary retrieval apparatus according to claim 1, wherein said complex-key management means manage lattice structured data, in which a data node corresponding to a boundary setting error is included and plural data nodes are combined in a graphic shape, as said information of said complex-key.

8. The dictionary retrieval apparatus according to claim 1, wherein said retrieval means interrupts retrieval at a suitable position partway through traversing said data nodes in said complex-key.

9. The dictionary retrieval apparatus according to claim 8, wherein said retrieval means restarts retrieval after the interrupted position by using information stored by said retrieval condition memory means.

10. The dictionary retrieval apparatus according to claim 1, wherein said retrieval means applies a depth first search for a tree into which said complex-key is expanded partway through traversing said data nodes in said complex-key.

11. The dictionary retrieval apparatus according to claim 1, wherein said retrieval means applies a breadth first search for a tree into which said complex-key is expanded partway through traversing said data nodes in said complex-key.

12. The dictionary retrieval apparatus according to claim 1, further comprising:

evaluation function calculation means for calculating evaluation function value for a node of a tree into which said complex-key is expanded;

wherein said retrieval condition memory means stores said evaluation function value corresponding to said accessed data node, and said retrieval means accesses a data node in order of better evaluation function value, partway through traversing said data nodes in said complex-key.

13. The dictionary retrieval apparatus according to claim 12, wherein said retrieval means obtains said corresponding record in said Tree Retrieval dictionary corresponding to a data node, in which said evaluation function value is better than a predetermined specific value, as said retrieval result.

14. The dictionary retrieval apparatus according to claim 12, said evaluation function calculation means calculates said evaluation function value by using a monotonically increasing evaluation function partway through traversing said data nodes in said complex-key, and said retrieval means accesses a data node in order of smaller evaluation function value.

15. The dictionary retrieval apparatus according to claim 14, wherein said retrieval means does not retrieve said corresponding record in said Tree Retrieval dictionary for a data node in which said evaluation function value is greater than a predetermined specific value.

16. The dictionary retrieval apparatus according to claim 14, wherein said retrieval means interrupts retrieval for a succeeding data node of a data node in which said evaluation function value is greater than a predetermined specific value.

17. A computer-readable storing medium, when used by a computer for retrieving a Tree Retrieval dictionary by using a retrieval key and for outputting an obtained result, used to direct said computer to perform the functions of:

managing a complex-key which includes plural data nodes combined organizationally and contains at least two retrieval keys;

retrieving a corresponding record in said Tree Retrieval dictionary by accessing data nodes in said complex-key;

managing information, which represents a position of an accessed data node in said complex-key, and a retrieval result obtained from said Tree Retrieval dictionary; and outputting said retrieval result.

18. A dictionary retrieval method for retrieving a Tree Retrieval dictionary by using a given retrieval key, comprising the steps of:

generating a complex-key in which plural data nodes combined organizationally are included and at least two retrieval keys are included;

retrieving a corresponding record in said Tree Retrieval dictionary based on information representing a position of an accessed data node by accessing data nodes in said complex-key; and outputting an obtained retrieval result.

* * * * *